(12) United States Patent
Hamilton et al.

(10) Patent No.: US 6,913,137 B2
(45) Date of Patent: Jul. 5, 2005

(54) METHOD OF RETROFITTING MAGNETIC GUIDE TO A GRID

(75) Inventors: John M. Hamilton, Goldsboro, NC (US); Ramanathan Ravindran, Dallas, TX (US); Mark S. Hittle, Goldsboro, NC (US)

(73) Assignee: Turkington APV USA, LLC, Goldsboro, NC (US)

( * ) Notice: Subject to any disclaimer, the term of this patent is extended or adjusted under 35 U.S.C. 154(b) by 0 days.

(21) Appl. No.: 10/464,103

(22) Filed: Jun. 18, 2003

(65) Prior Publication Data

US 2004/0256202 A1 Dec. 23, 2004

(51) Int. Cl.[7] .............................................. B65G 15/46
(52) U.S. Cl. ............................... 198/803.6; 198/690.1; 198/867.04
(58) Field of Search ..................... 198/803.6, 867.04, 198/690.1

(56) References Cited

U.S. PATENT DOCUMENTS

| | | | |
|---|---|---|---|
| 3,871,510 A | 3/1975 | Homeier | |
| 4,586,601 A | 5/1986 | Hodlewsky | |
| 4,729,470 A | 3/1988 | Bacigalupe et al. | |
| 4,760,911 A | 8/1988 | Bacigalupe et al. | |
| 4,836,360 A | 6/1989 | Kasik | |
| 4,972,941 A | 11/1990 | Kasik | |
| 5,056,654 A | 10/1991 | Kasik | |
| 5,115,905 A * | 5/1992 | Hollinger, II | 198/803.6 |
| 5,147,033 A | 9/1992 | Kasik | |
| 5,188,216 A | 2/1993 | Smith et al. | |
| 5,579,897 A | 12/1996 | Kasik | |
| 5,649,619 A | 7/1997 | Kasik | |
| 5,871,084 A | 2/1999 | Kasik | |
| 6,315,108 B1 * | 11/2001 | Bootsman et al. | 198/690.1 |

* cited by examiner

Primary Examiner—Joseph Valenza
(74) Attorney, Agent, or Firm—Morris, Manning & Martin LLP

(57) ABSTRACT

A method of retrofitting a magnetic centerguide to a grid. The grid is of the type adapted to carry a pan along a path defined by a conveyor to which the grid is attached. The centerguide is of bifurcated construction which is split at one or both ends of its structure in order to allow it to be maneuvered about the grid structure for partial assembly. After being partly assembled, a fastener secures the bifurcated portion together to provide a magnetic centerguide in which the underside of a magnet is attracted to and thereby guides a pan when placed on the grid.

15 Claims, 28 Drawing Sheets

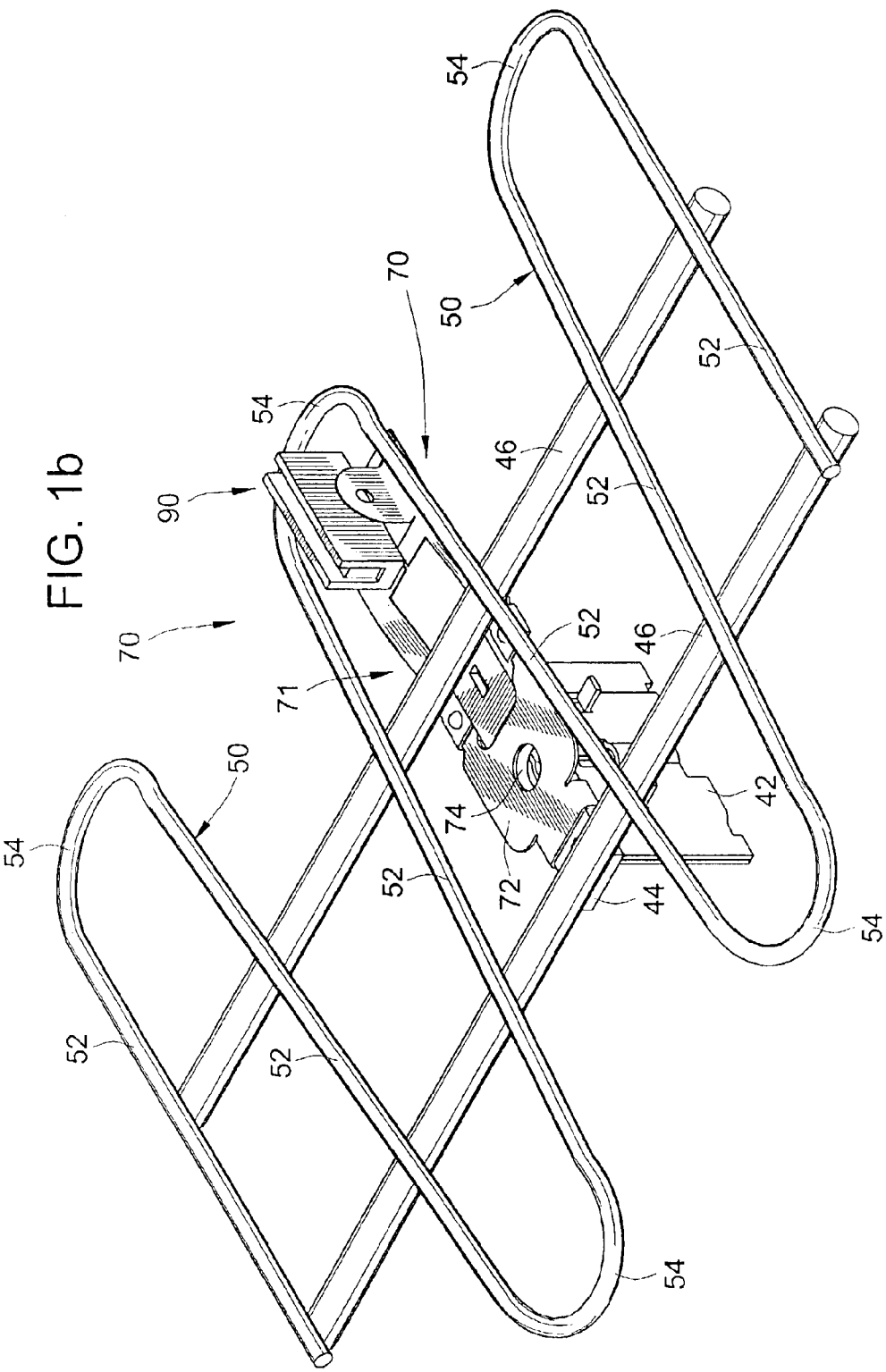

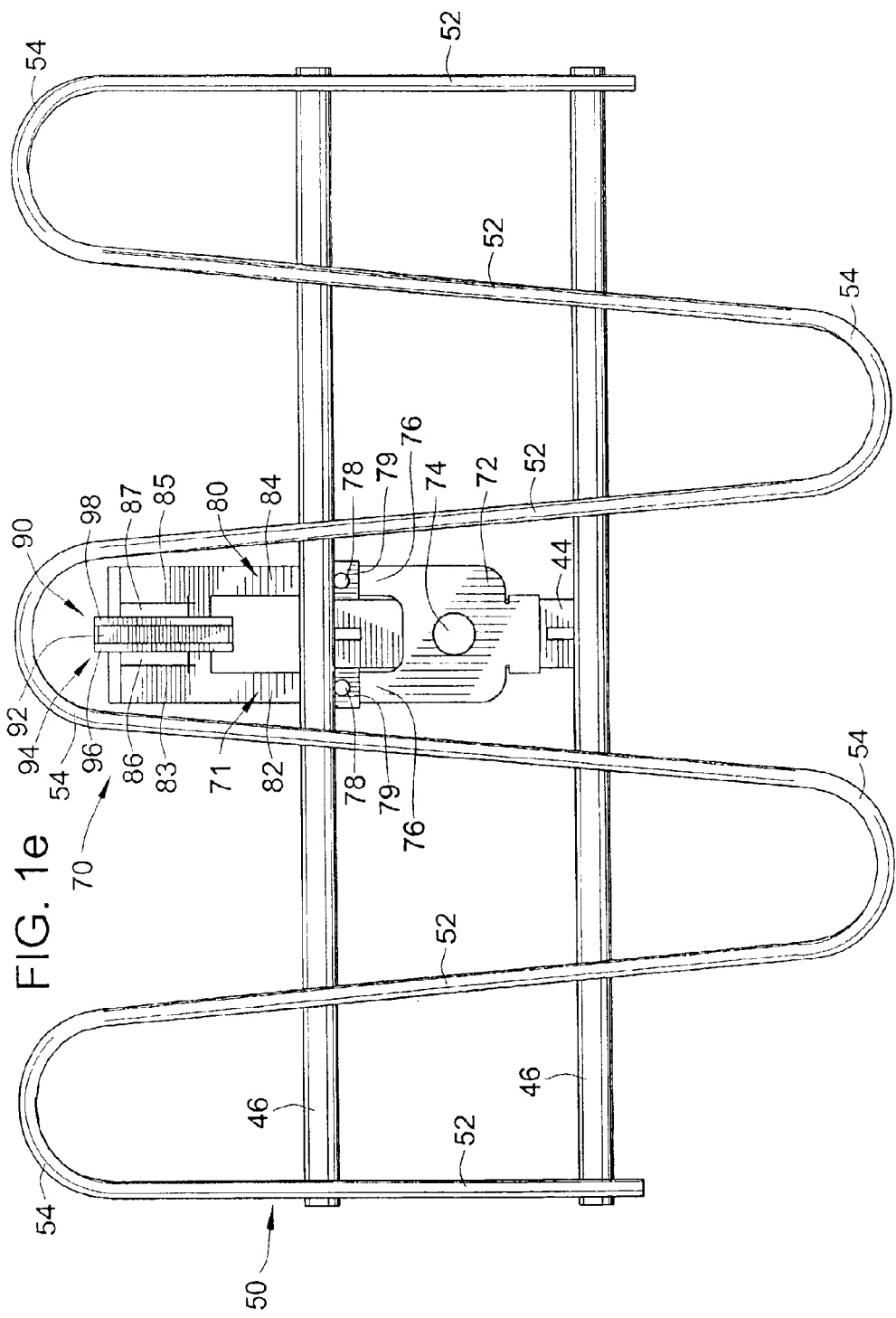

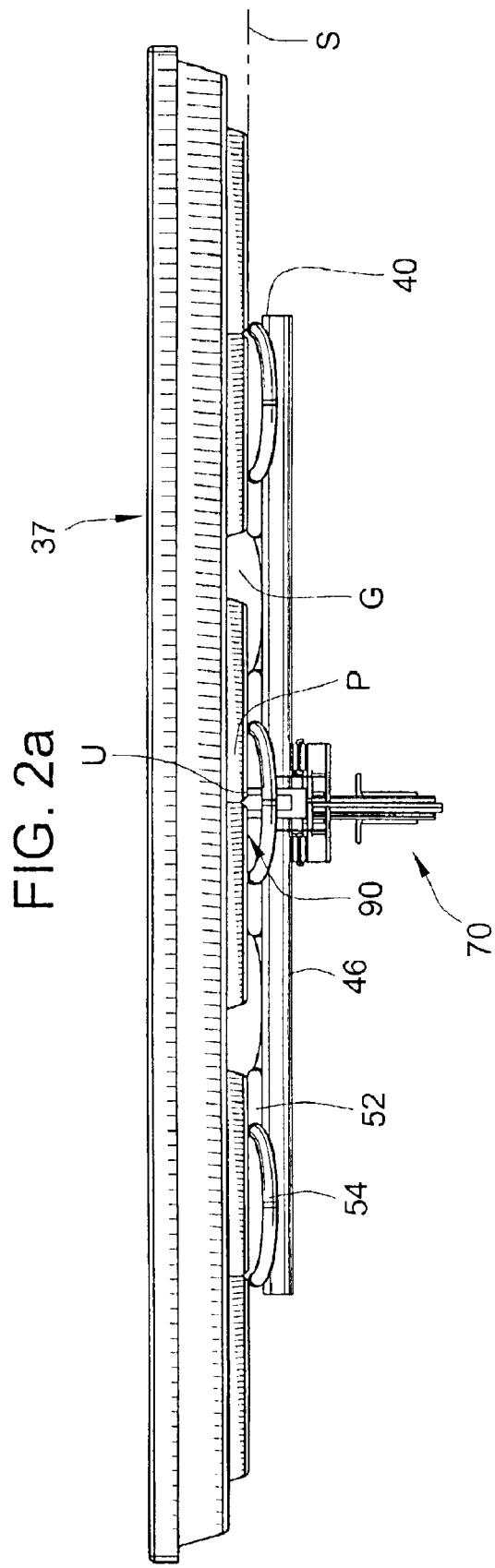

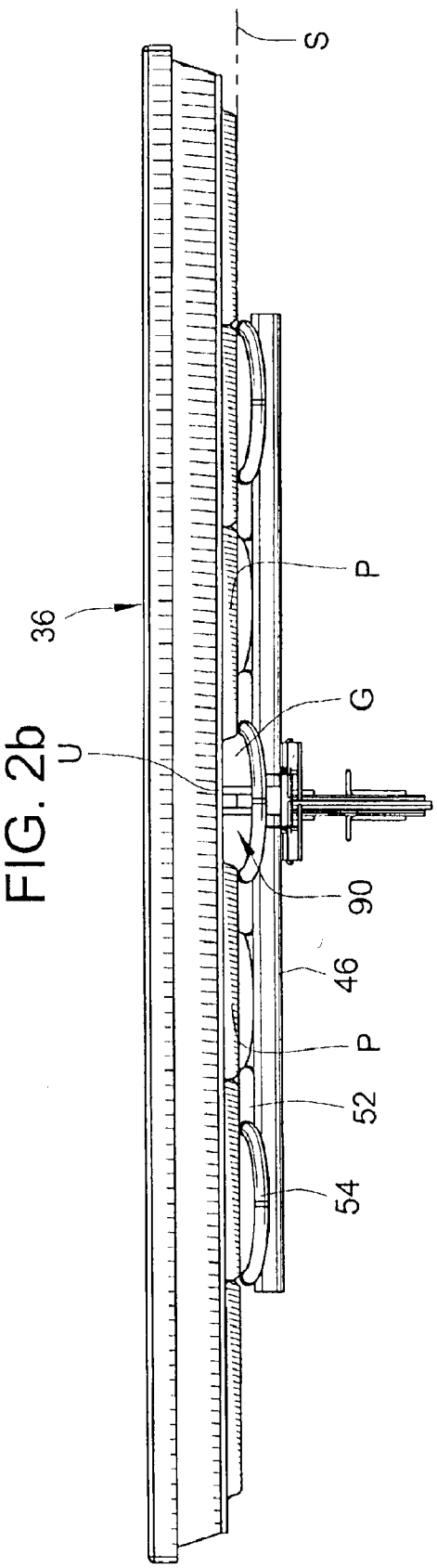

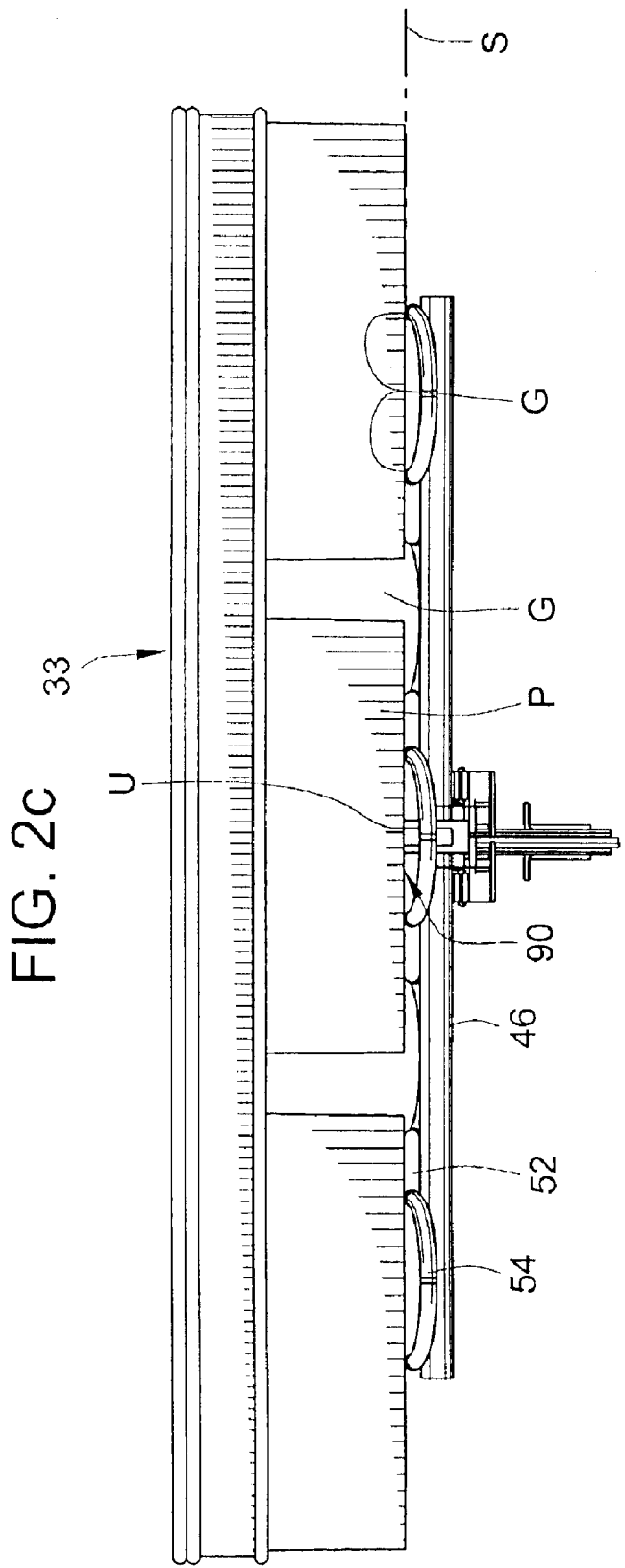

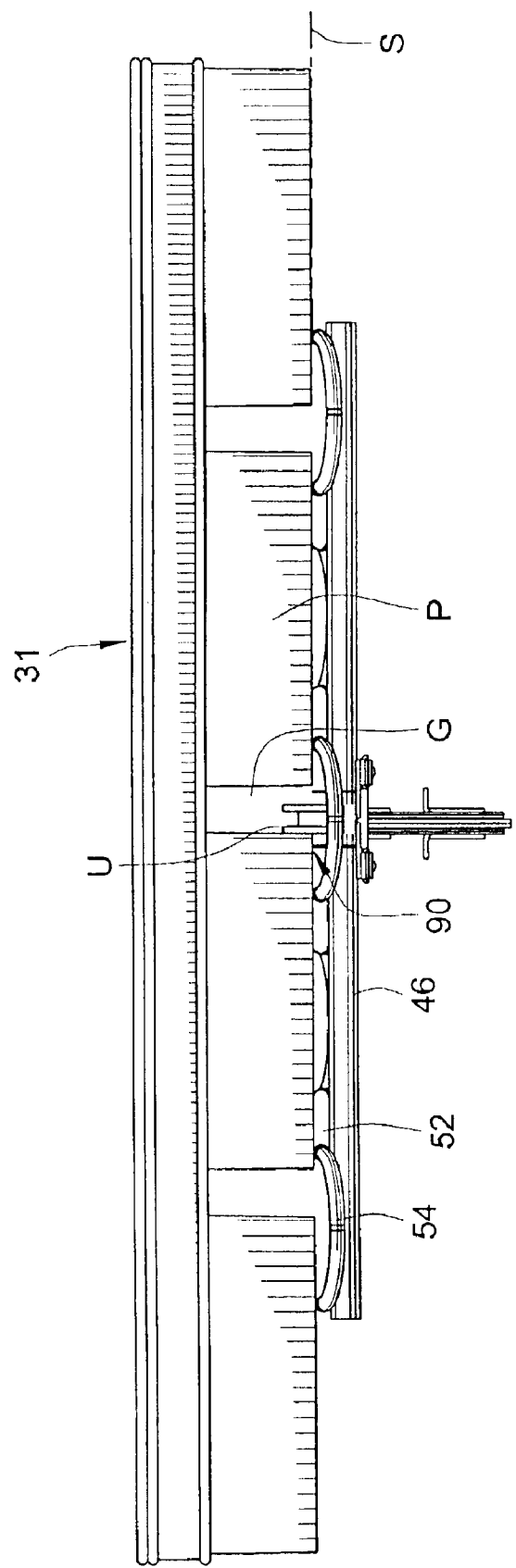

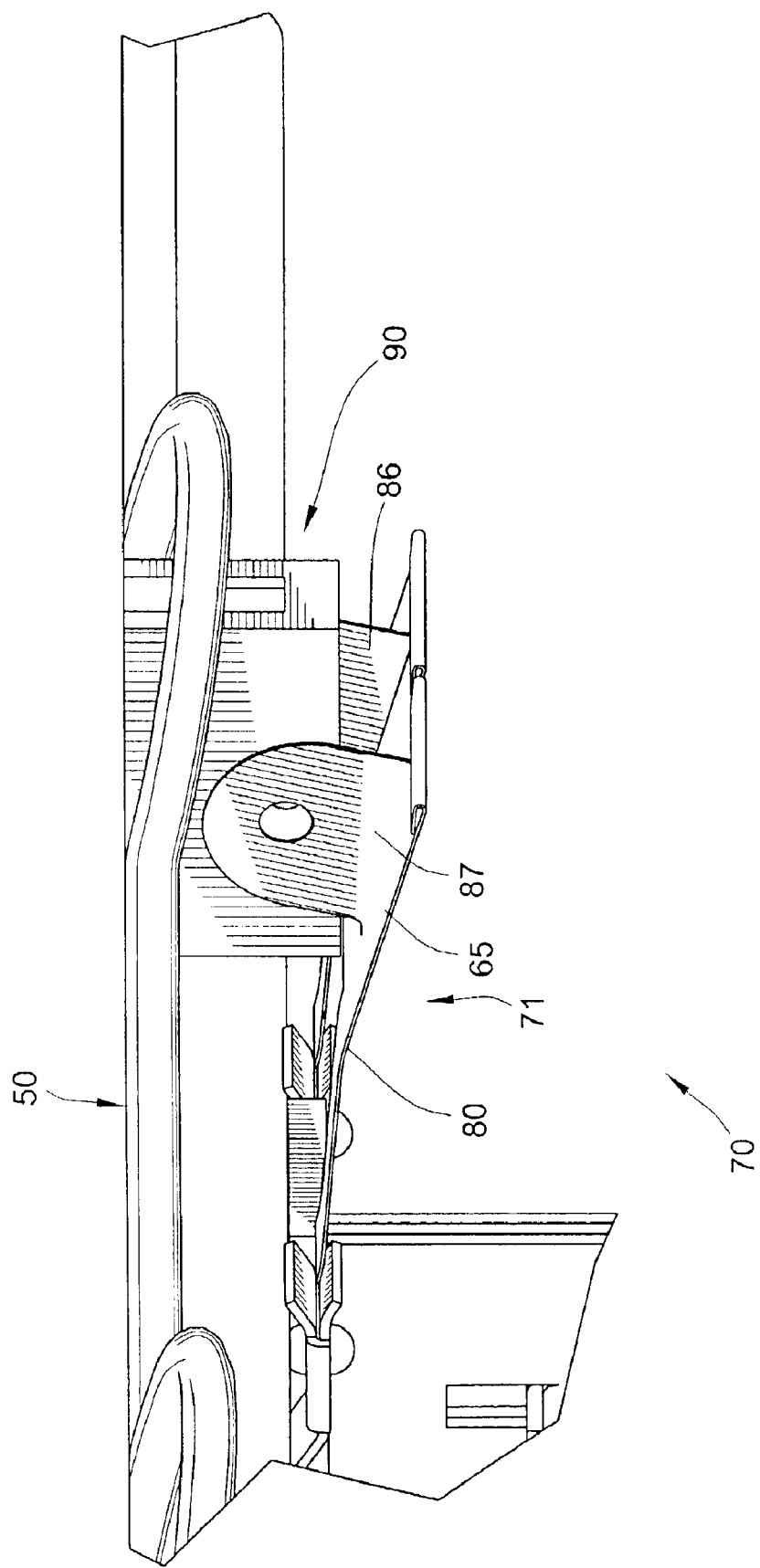

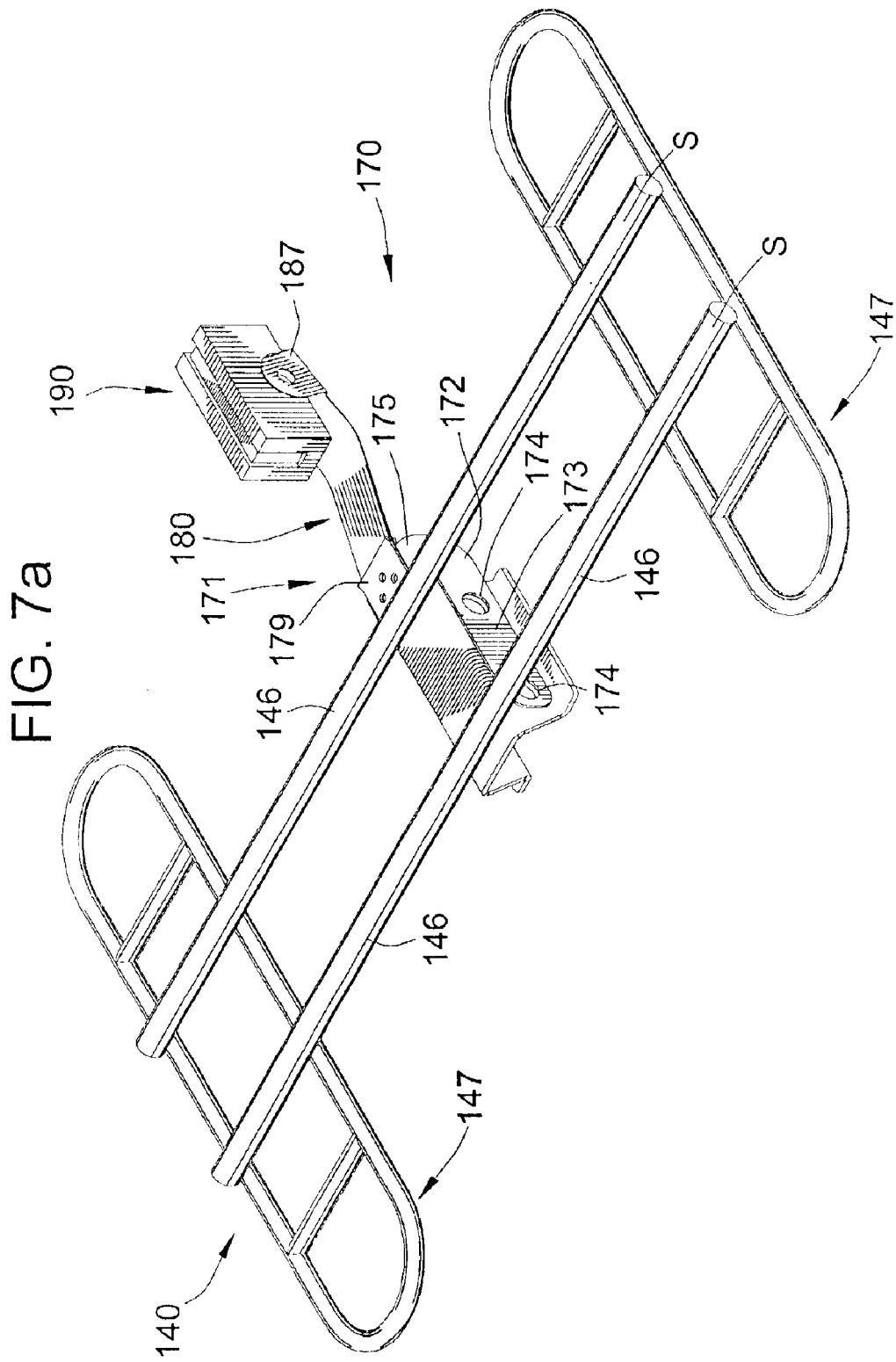

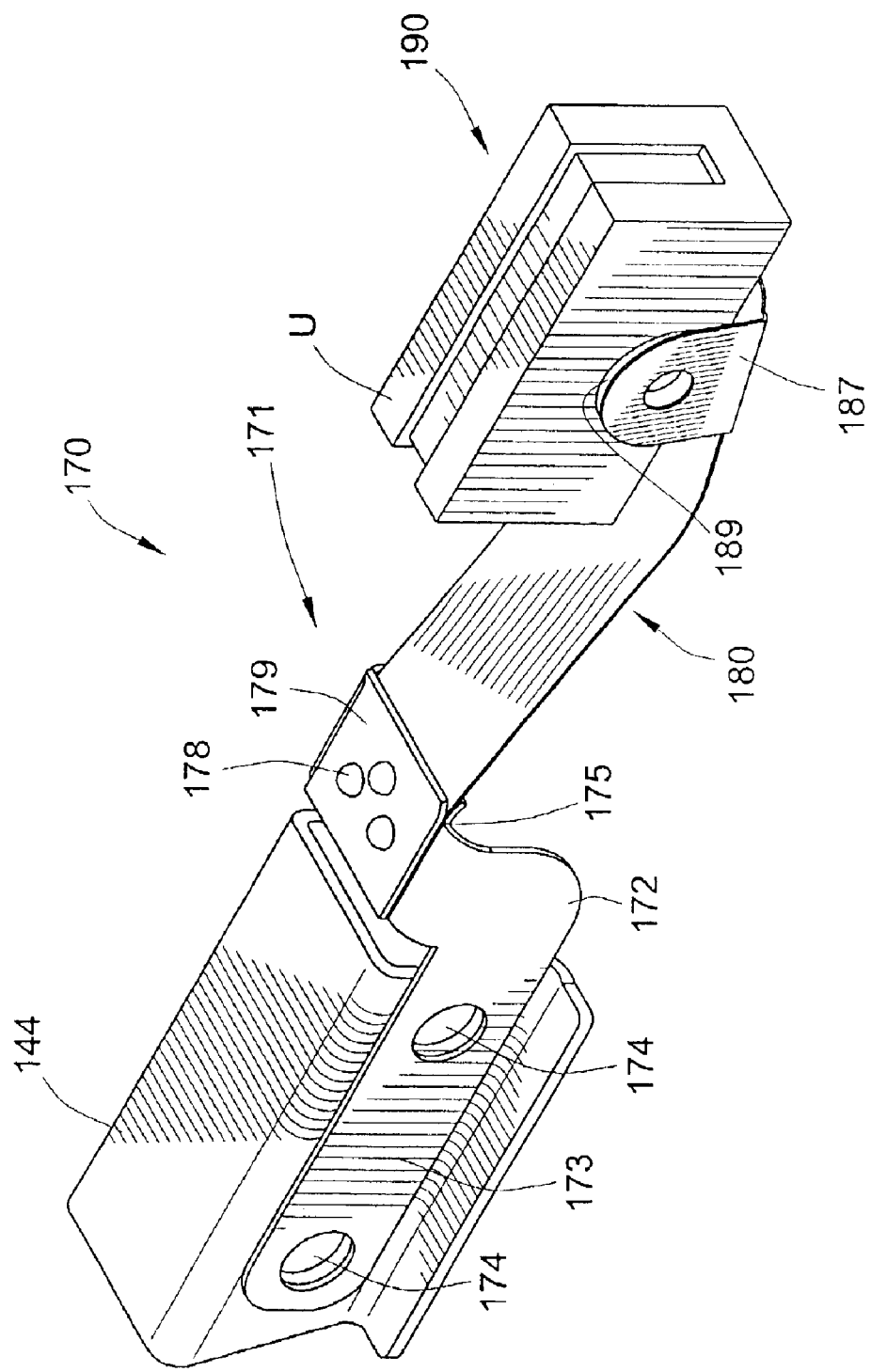

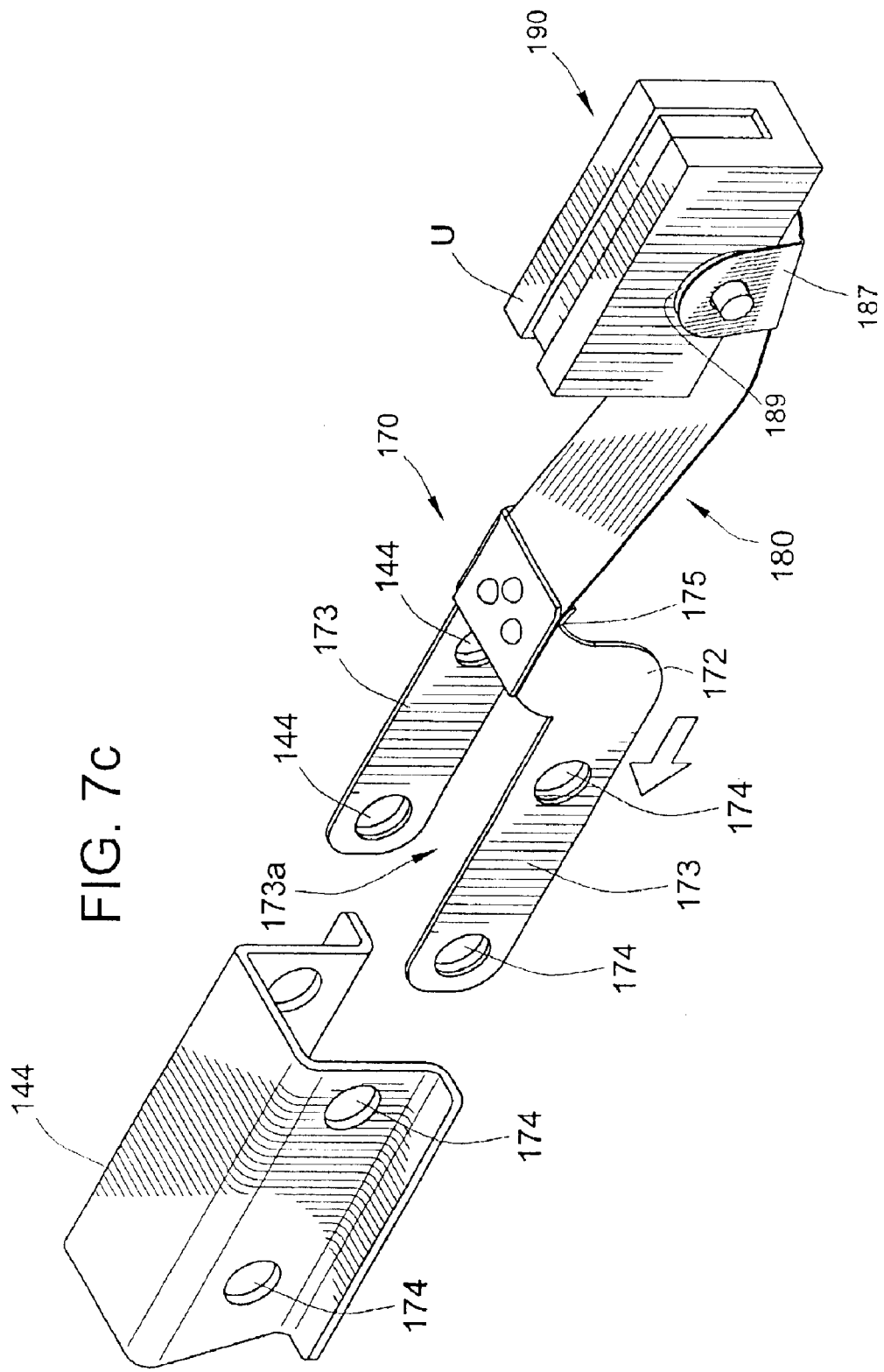

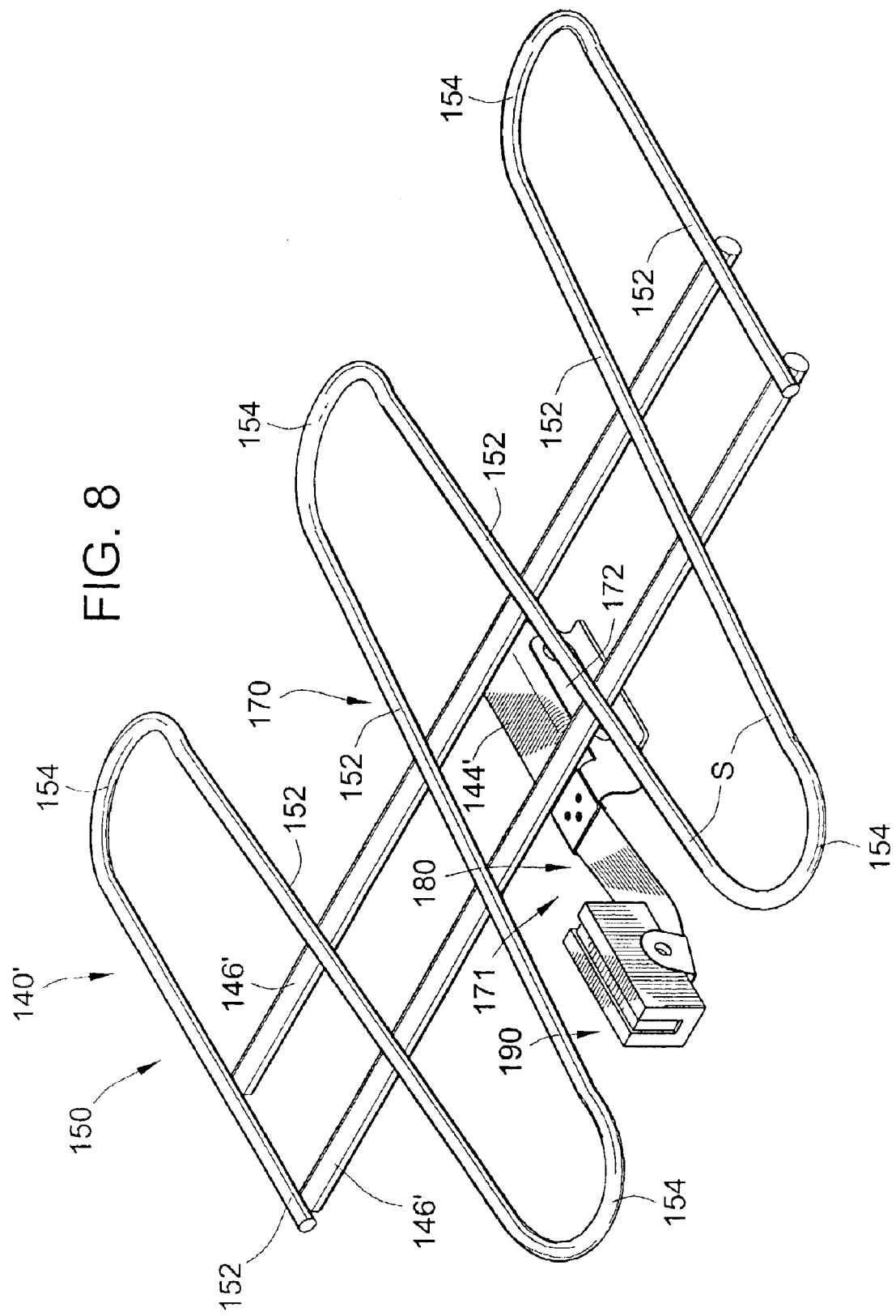

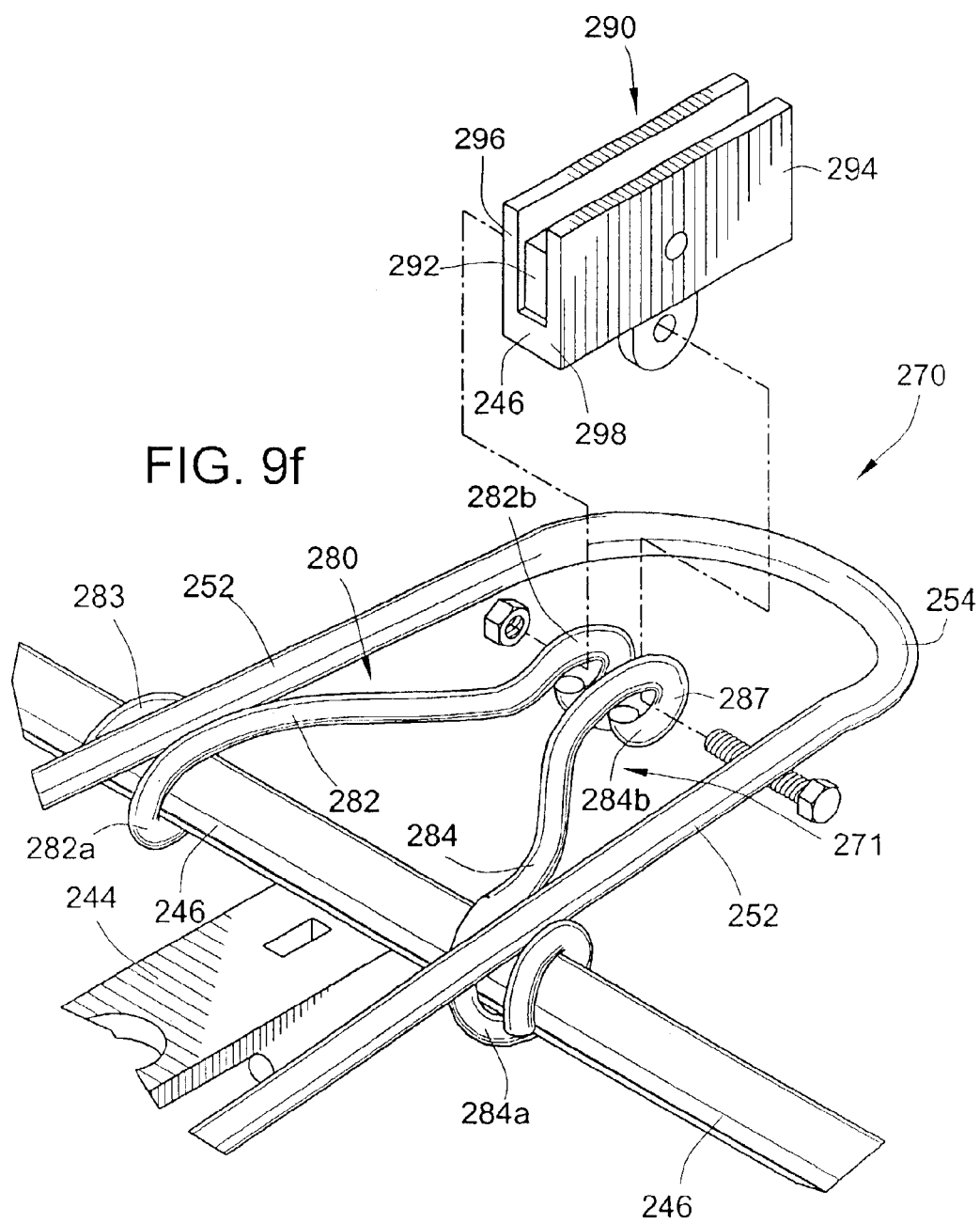

US 6,913,137 B2

METHOD OF RETROFITTING MAGNETIC GUIDE TO A GRID

FIELD OF THE INVENTION

The present invention relates generally to grids used to support pans on a food processing conveyor, and more particularly relates to magnetic guides for maintaining the position or orientation of pans with respect to the grids.

BACKGROUND OF THE INVENTION

In the commercial food processing industry, it is conventional to utilize conveyors having a series of grids attached to the conveyor to carry the food product over a predetermined path for processing. For example, in the baking industry, large proofers and ovens employ continuously moving conveyors to transport dough products through the baking process. The conveyors trace a multi-tier spiral or circular path through the proofers or ovens to achieve sufficient residence time to allow the dough to rise in the proofer and to bake in the oven. The dough products are placed on metal pans which can vary in size and shape depending on the product, i.e. rolls, loaves, etc. One particularly successful bakery conveyor system has been developed by APV Baker, and is generally disclosed in a number of prior patents including U.S. Pat. Nos. 4,997,365 and 5,010,808.

Generally, bakery conveyors include an elongated track supporting and guiding a conveyor chain to define a path of travel. A series of grids, attached to the chain, support a series of pans carried along the path through one or more processing operations. It is inevitable that pans will be jostled around on the track due to such things as vibration or interference with other structures or pans. Travel around curves in oval or spiral conveyors will also cause the pans to move and change position on the grid. Shifting of any significant amount is undesirable because it can cause interference between pans, and occasionally cause pans to fall off the conveyor or otherwise cause a jam, which results in downtime of the conveyor and the baking system.

Magnetic grids, usually containing 2 or more magnets per grid, have been suggested to hold the pans in place. In some designs, the magnets are fixed vertically but allow a limited amount of movement in a horizontal plane. In other designs as exemplified by Kasik U.S. Pat. No. 4,836,360, the magnets can move vertically and horizontally. Magnetic grids are generally characterized by the fact that the pans are supported on and carried by the magnets and the magnets in turn carried by the grids. In effect the magnets, not the grids, provide the support surface for the pans.

Since not all track is straight, travel of the pans around curves can create problems. Sometimes pans are placed on only a single grid, while at other times a pan will be supported on 2 or more grids. In traversing curves, relative movement between the pans and the grids is a given, and controlled magnet movement has been suggested as a mechanism for allowing this movement around curves yet keeping the pans affixed to the magnets. Pans originally misaligned will at best remain misaligned, and at worst become further misaligned, interfere with another pan, or fall off the conveyor. Due in part to the various combinations of pan size and grid geometry, problems can arise which are not all readily solved. For example, baking can be disrupted if a pan is not placed properly, or if it interferes with another pan.

Centerguides have also been used to help align pans in the first instance, and keep them tracking correctly, including tracking through curves. Centerguides are mechanical structures which project above the grid surface to engage or contact some part of the underside of a pan which is being carried on the surface of a conventional grid or on the magnets of a magnetic grid. Conventional mechanical centerguides utilize a guide member which projects above the grid and engages the underside of the pan intermediate a pair of dough-holding pockets; mechanical engagement between the guide and the pockets tends to keep the pan tracking correctly. Mechanical centerguides are sometimes preferred to magnetic grids because they function to keep the pan oriented with respect to the direction of conveyor travel. Theoretically the center of the pan, which is engaged by the centerguide, is held on the center of conveyor travel. However pans vary, for example in number of pockets, placement of pockets, location of the inter-pocket gaps, etc., presenting limits to the utility of centerguides in some circumstances. The situation can be further complicated when pans of different configuration are utilized by the baker at the same time, such that successive grids are carrying pans of different configuration.

To overcome some of these problems, a rocker type guide has been employed. The rocker guide has two physically connected but laterally spaced guides, one of which is centered on the path of travel, the other being non-centered, and only one of which is operative at any given time. The guides are mounted on opposite ends of the rocker which can pivot to dispose one of the guides below, and the other guide above the grid surface. The pan underside pushes one of the guides below the grid to raise the opposite guide hopefully between adjacent pockets of the pan. As the conveyor carries the grids around the defined track, the guide, riding in the space between the pockets, attempts to maintain the orientation of the pan on the grid. Even with rocker guides, the operative guide is held above the grid surface by a positive mechanical mechanism.

Unfortunately, the width of the rocker guides vary with different grids, dictated by the type of product being processed. In some situations, the width of the rocker guide is insufficient and both of the laterally spaced guides may lie beneath the bottoms of two pockets, rather than in between pockets. This condition would fail to laterally restrict the pans and indeed would cause instability in the pans. Further, neither of the two aforementioned guides seek to accommodate different depths of the pockets, or differently sized spaces between the pockets.

There is a large installed base of conveyor systems with grids of various types which might be improved by use of a magnetic centerguide according to the present invention. The economies of bringing the invention to such environments would be significantly enhanced if a centerguide structure capable of retrofitting, and a method of retrofitting existing grids with a centerguide, could be provided.

BRIEF SUMMARY OF THE INVENTION

In light of the above, it is a general aim of the present invention to provide a magnetic centerguide that is applicable to different types of pans having different numbers of pockets and different shapes of pockets, including different widths, depths and spaces between pockets. Such a centerguide can be characterized as universal, with the following proviso. Universality can be important not only to a user who processes many different types of products, but also the equipment manufacturer who might sell common equipment to many different users each with much simpler requirements.

It is an object of the invention to provide a method of retrofitting magnetic centerguides to existing grids.

The invention provides a method of retrofitting a magnetic guide to an existing grid. The grid is of the type for connection to a conveyor and is structured to provide a support surface for carrying pans around a path defined by the conveyor. The method comprises the steps of providing a guide support having a bifurcated construction on at least one end thereof. The method includes maneuvering the bifurcated construction around a portion of the grid to place the guide support in a partly assembled state on the grid. The guide support is then secured to the grid and a magnet secured to the guide support. At least a part of the previous step involves making a connection through the bifurcated construction. The retrofitting of the guide by the aforementioned steps provides an operative upper surface of the magnet to be positioned with respect to the support surface to cause the magnet to attracted to a pan when placed on the grid.

The retrofitting method can also be characterized by the steps of starting with an existing grid having a support surface for a pan and a mounting structure for attachment to a conveyor. A centerguide is provided having a pair of spring arms, first ends of the spring arms having a mounting structure, and second ends of the spring arms being unattached to each other. The mounting structure is then connected to the grid. A magnet is connected to both free ends of the spring arms in such a way that the spring arms bias the magnet upwardly at the support surface.

The method is also characterized as a method of retrofitting a magnetic guide to a grid, the grid being of the type connected to a conveyor and structured to provide a support surface for carrying pans around a path defined by the conveyor. The method includes the steps of providing a guide support having two spring arms having free ends for receiving the magnet. The spring arms are attached to the grid with the free ends of the arms projecting toward the support surface. A magnet is then connected to the free ends of the spring arms to provide a unitary guide member capable of attaching to pans when placed on the support surface.

The method of the invention can also be characterized as one of retrofitting an existing grid with a guide, the grid defining a support surface for carrying a pan along a conveyor defining a path of travel. The grid includes a grid mounting plate structure for attachment to the conveyor and for support bar attached to the grid mounting plate. The method includes the steps of attaching a guide mounting plate to one of the grid mounting plate and the first support bar, and thereafter mounting a magnetic guide member to the guide mounting plate for vertical movement relative to the support surface.

More narrowly, the method contemplates retrofitting an existing grid with a centerguide. The grid is of the type which defines a support surface for carrying a pan along a conveyor defining a path of travel, and includes a grid mounting plate having an attachment structure connecting the grid to the conveyor. The method includes the steps of disassembling the attachment structure, providing a centerguide having a guide mounting plate and a guide member for engaging the pan, positioning the guide mounting plate proximate the grid mounting plate, and reassembling the attachment structure to link the guide mounting plate to the grid mounting plate together and to the conveyor.

Finally, a method of retrofitting a grid with a guide as provided. The grid is of the type which provides a support surface for a pan carried by a conveyor along a path of travel. The grid includes a first support bar extending transversely relative to the path of travel and the second support bar attached to and extending across the first support bar to define a support surface for supporting the pan. The method includes the steps of providing a pair of mounting arms each having a first end that forms a coil having a central axis, spreading the coil to form a gap between rings in the coil, positioning the first support bar within the gap and rotating the mounting arm to position the second support bar within the gap and the first support bar within the coil. Thereafter a guide member is attached to the mounting arm.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIGS. 1b–1e depict a grid employing an embodiment of the universal centerguide;

FIGS. 2a–2d depict the grid of FIGS. 1a–1e having different pans supported thereon;

FIGS. 4a–4e depict the grid and universal centerguide of FIGS. 1–2, the guide being in a lowered position;

FIGS. 7a–7b depict another embodiment of the universal centerguide constructed in accordance with the teachings of the present invention;

FIGS. 7c–7d depict the retrofitting of the centerguide on the grid of FIGS. 7a–7b;

FIG. 8 depicts the universal centerguide of FIGS. 7a–7b applied to a different grid type;

FIGS. 9c–9f depict the retrofitting of the centerguide to the grid of FIGS. 9a–9b.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

Figure 1A:
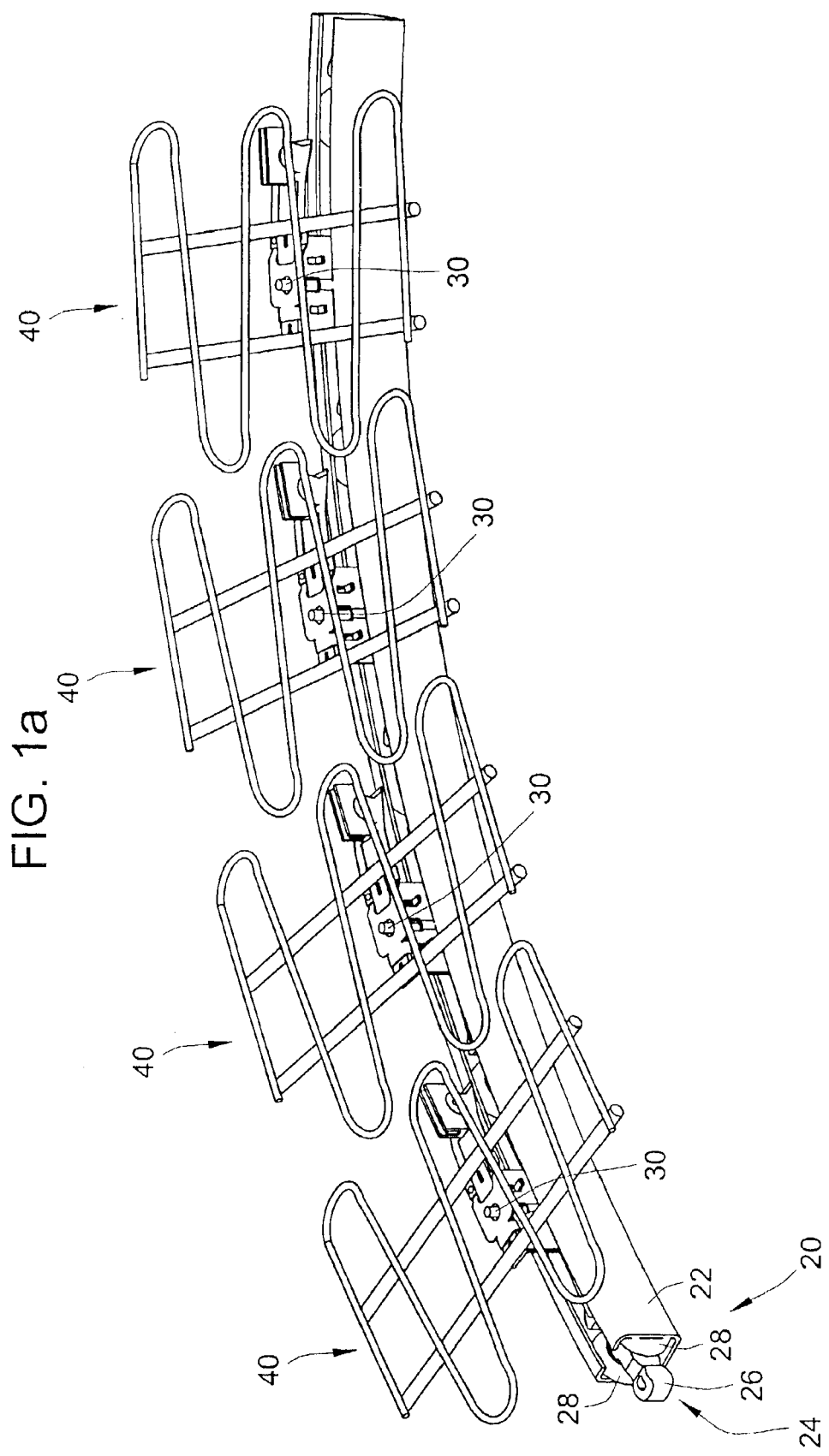
FIG. 1a is a perspective view of a curved conveyor section having grids employing an embodiment of the universal centerguide constructed in accordance with the teachings of the present invention.

Referring now to the drawings, FIG. 1a illustrates a curved section of a conveyor 20. The conveyor includes a track 22 which houses and guides a chain 24. The conveyor 20 has a centerline or path of travel defined by the track 22 and chain 24 within the track.

As is known in the art, the chain 24 generally includes a plurality of connected links 26, each having a plurality of rollers 28 which guide and support the chain 24 as it travels through the track 22. In the illustrated embodiment, each link 26 includes a vertical pin or bolt 30 which is used to connect the link 26 to a grid 40. It will be recognized by those skilled in the art that any type of conveyor can be used with the present invention, and many types of connecting structures can be used to attach each grid to the conveyor.

Figure 1C:
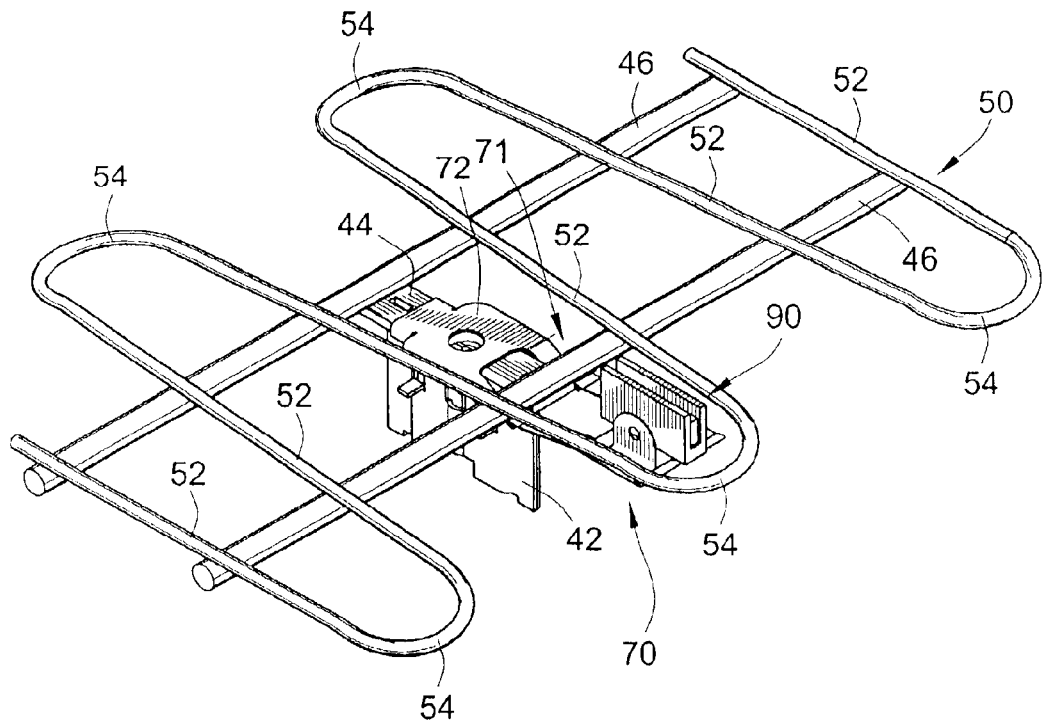

The grids 40 will now be described with reference to FIGS. 1b–1c, however it will be recognized that many different types of grids can be used with the present invention, as will be described in more detail herein, as well as in concurrently filed co/pending application Ser. No. 10/464,101 entitled Magnetic Centerguide Each grid 40 includes structures for attaching the grid to the conveyor. In the illustrated embodiment that structure includes a grid mounting plate 44 horizontally disposed and centered on the grid. A pendant plate 42 is also utilized to attach the grid 40 to the chain 24 and vertically space the grid therefrom. The pendant plate 42 includes a vertical sleeve for receiving the bolt 30, and is sandwiched between the chain 24 and the grid mounting plate 44, all of which is fixed in place by the bolt 30 and corresponding nut (not shown). Thus the grid mounting plate 44 is horizontally mounted atop the pendant plate 42. A support bar structure is carried by the grid mounting plate and is configured to support a pan. In the illustrated embodiment, at least one, and preferably two as depicted, support bars 46 are attached to the grid mounting plate 44 and extend transversely relative to the path of travel (the path being to the upper right in FIG. 1b). End plates may connect the transverse support bars 46.

In this embodiment of the grid 40, a second support bar 50 is attached to the transverse support bars 46 and defines a grid support surface on which pans rest. The support surface lies in a generally horizontal plane. The support bar 50 is generally W-shaped, and zigzags back and forth across the support bars 46. More specifically, the support bar 50 includes several longitudinal portions 52 extending generally parallel to the path of travel, although somewhat rotated to the left or right. The longitudinal portions 52 are connected by U-shaped portions 54, which preferably are bent slightly downwardly.

Figure 1D:
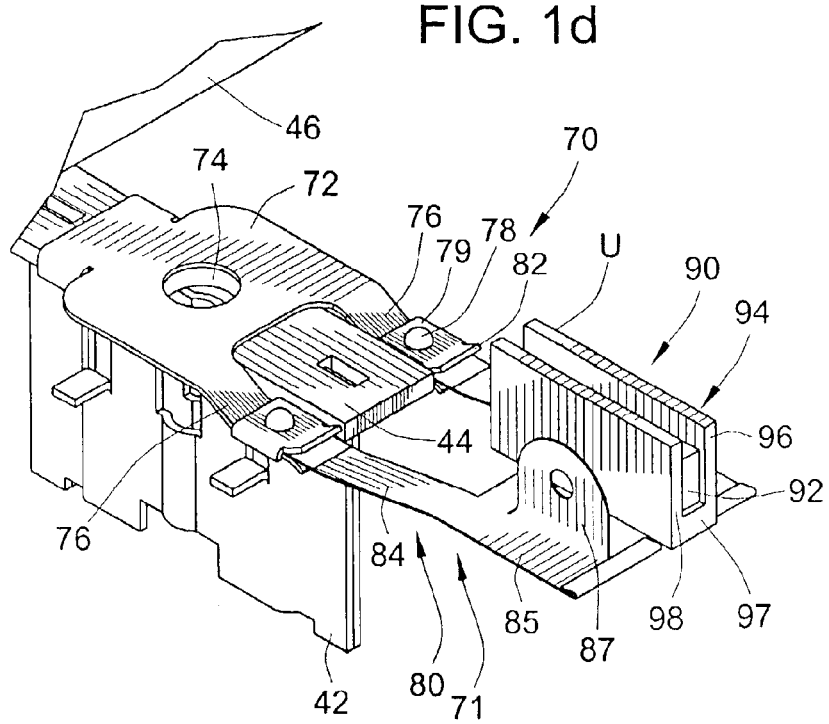

One embodiment of a magnetic centerguide assembly 70 is also shown in FIGS. 1a–1e, and most clearly seen in the enlarged, partially cut-away view of FIG. 1d. For clarity of illustration, the forward horizontal support bar 46 is not shown in FIG. 1d.

In practicing the invention the centerguide assembly 70 is connected to the grid structure by a guide support 71 which is attached to the grid, such as by attachment to the support bars or to the grid mounting structure itself. In the present example, the guide support 71 is connected by way of attachment to the grid mounting plate. The guide assembly 70 generally includes a guide mounting plate 72 structured for attachment to grid mounting plate 44. In the illustrated embodiment, the guide mounting plate 72 rests on top of grid mounting plate 44 and includes a hole 74 that matches the hole in the grid mounting plate 44 for receiving the bolt 30, which is then secured with a nut (not shown). Hence the attachment structure used to connect the grid 40 to the conveyor 20 is also used to attach the centering guide 70.

In carrying out the invention, the centerguide assembly 70 and its guide support 71 carry a guide member 90, which in turn supports magnet 92. This structure provides the magnet 92 with the capability to have its operative upper surface U depressed below the grid support surface, and also to move vertically above the grid support surface, so that it can engage the pan in the inter-pocket gaps. In the present embodiment, spring arms are utilized to suspend the magnet from the grid and provide vertical movement capability, assisted by the magnets. For convenience, in the present embodiment, the mounting arms are of two piece construction, including the previously described guide mounting plate 72 and an attached bifurcated spring arm 80. The guide mounting plate 72 extends laterally beyond the grid mounting plate 44 and includes two legs 76 that extend downwardly and forwardly. The spring arm 80 is of bifurcated construction, including two legs 82, 84 which are attached to the mounting plate legs 76. Although any well known fastener can be used, this embodiment utilizes a rivet 78 struck through a protective plate 79, the spring arm 80, and the leg 76. The protective plate has downturned sides, as well as an upturned front lip, mirroring the downturned front lip of the legs 76, providing protection to the spring arm 80, and allowing smooth deflection of the spring arm 80. The arms 82, 84 which make up the spring arm 80, in the present embodiment are joined together by way of the guide mounting plate 76 at the mounting structure end 82a, 84a, and have free ends 82b, 84b projecting toward the guide support surface. The free ends 82b, 84b are unconnected until they are joined by connecting of the magnet assembly or guide member 90 to both free ends, as will be described.

The spring arm 80 in the illustrated embodiment is a mechanical spring, and more particularly a flat metal spring. Other mechanical springs can be used however, and the spring arm need only comprise a resilient material that deflects from a neutral position. As will be described in more detail herein, the spring arm 80 is utilized to provide vertical movement to a magnetic guide member 90 attached thereto, and thus may also comprise a pivotable arm that does not need to be of a resilient or deflecting material. A simple rigid arm mounted to the guide mounting plate 72 for rotation about a horizontal axis would suffice. A spring or other resilient material could then be employed to bias the rigid arm to a neutral position, although this is not essential, as vertical movement of the magnetic guide member 90 as described is the primary requirement.

Turning back to the illustrated embodiment, the left and right springs 82, 84 of the spring arm 80 extend forwardly and upwardly to generally horizontal mounting surfaces 83, 85 each having a bent over front lip and upturned mounting flanges 86, 87. The ends 82b, 84b are not connected prior to installation of the magnet, which is an important feature for many retrofit applications, as will be described. The flanges 86, 87 define an internal space for mounting a magnetic guide member 90 to the spring arm 80.

Figure 6A:
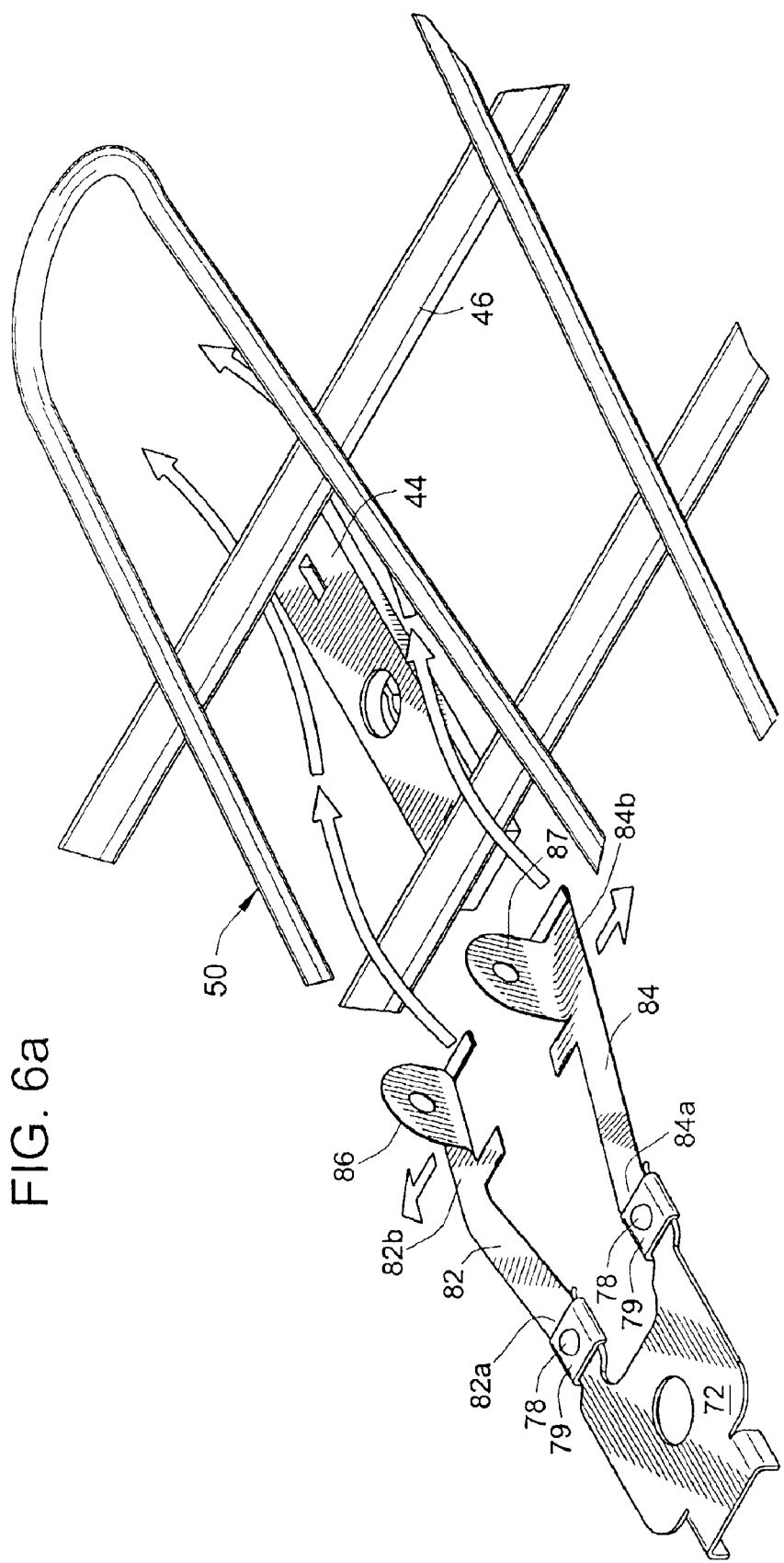
FIGS. 6a–6c depict the steps for installing the magnetic centerguide on the grid of FIGS. 1b–1e.
Figure 6B:
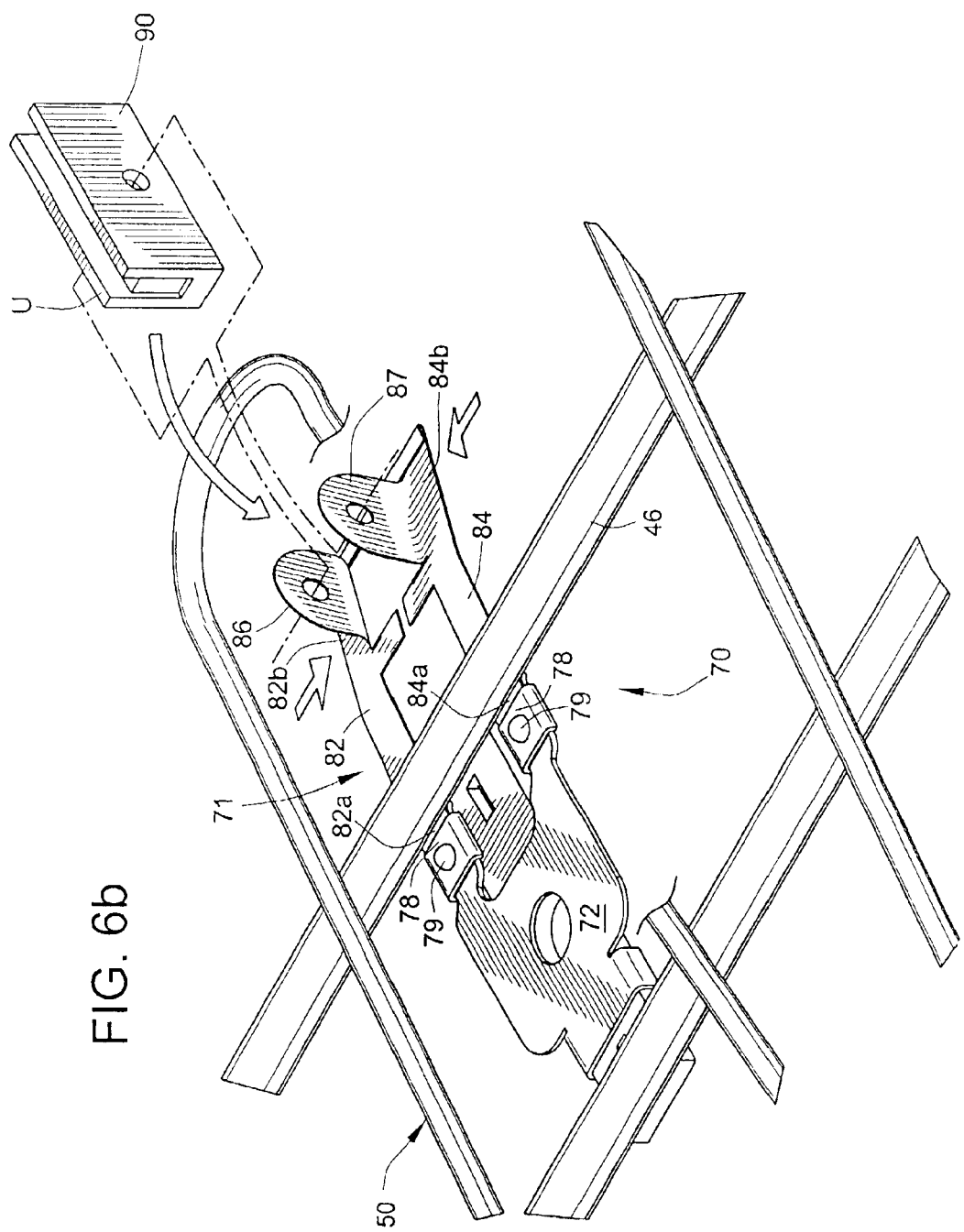
Figure 6C:
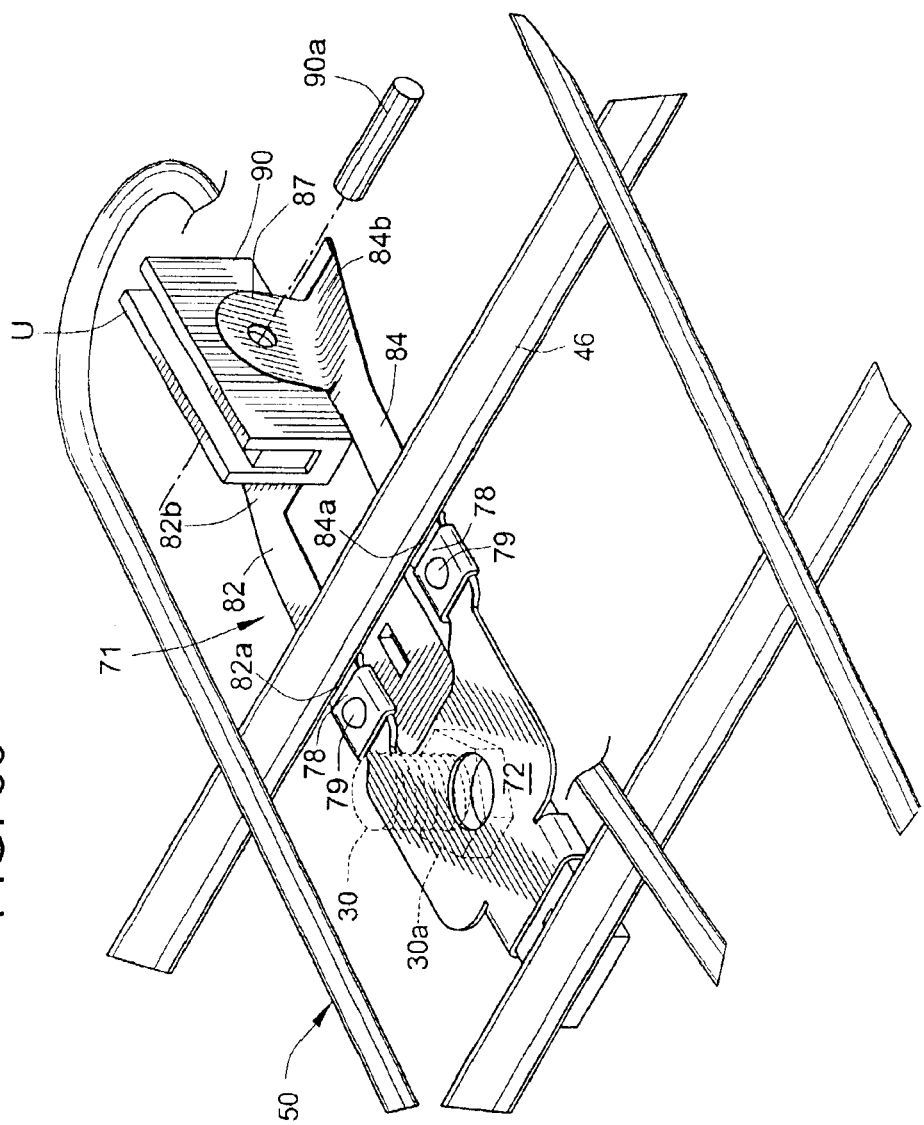

It will be recognized that the guide assembly 70 is configured to be retrofit to an existing grid 40. That is, the left and right springs 82, 84 may be spread apart at their free ends 82b, 84b (i.e., the ends which are to be attached to the magnet). FIGS. 6a–6c show the retrofit procedure. In FIG. 6a the spring arm 80, clearly shown to be bifurcated having two separate arms 82, 84 with free unjoined ends 82b, 84b, is shown with the free ends spread sufficiently to fit over the grid mounting plate 44. The arrows indicate the direction of insertion and FIG. 6b shows the guide mounting assembly inserted over the grid and in a partly assembled position ready to receive the magnet. When the magnet is in place, as shown in FIG. 6c, the free ends 82b, 84b are connected together by way of the guide assembly or magnet 90. FIG. 6c shows the magnet 90 in position and a pin 90a being inserted through the flanges 86, 87 and the guide assembly 90, to secure the free ends to the magnet to form a unitary assembly at the free end. FIG. 6c also shows in phantom the mounting stud 30 (see FIG. 1a) of the conveyor and a nut 30a. It will be recalled that when the guide mounting plate 72 is positioned over the grid mounting plate 44 as shown in FIG. 6c, the stud 30 projects through the aligned set of apertures and a fastener, such as hex nut 30a secures the guide to the grid and the grid to the conveyor.

The magnetic guide member 90 in the illustrated embodiment includes a magnet 92 contained in a housing or yoke 94. In some cases the guide member 90 will include only the magnet and other structure can be dispensed with. The magnet 92 and housing 94 have been illustrated as rectangular, although they may be of various shapes, sizes and orientations depending on the particular application. Suffice it to say that the guide member 90 is sized so that at least a portion of the guide member 90 fits between a column of pockets or indentations on the underside of a pan. Preferably, the guide member 90 is centered on the path of travel, although this location is not essential in the broadest practice of the invention. In the illustrated embodiment, the housing 94 is generally U-shaped defined by left and right members 96, 98 connected by a link 97. Preferably the left and right members 96, 98 are of magnetically permeable material to concentrate lines of flux between the magnet and the pan which comes into contact with the members 96, 98. When so configured, the upper surface of the members 96, 98 can be considered the operative upper surface U of the magnet. The link 97 is of non-magnetically permeable material, so as not to introduce a magnetic shunt at that location, which concentrates the lines of flux in the pan. Preferably, the magnet 92 is glued inside the housing 94, and a cover (not shown) is fit over the area of the magnet shown exposed in the figures, to be held in place by the same glue or adhesive.

The left and right members 96, 98 of the housing 94 include two opposing apertures that match apertures in each of the flanges 86, 87 for attaching the guide 90, typically by way of a threaded fastener or pin. The guide 90 is preferably spaced above the mounting surfaces 83, 85, and is pivotally attached to the flanges 86, 87 for rotation about a horizontal axis. It will be readily recognized by those skilled in the art that numerous other well-known attachment structures can be used to mount the guide 90 to the spring arm 80. For example, the outer surface of the housing 94 could include tabs that correspond to the apertures in the mounting flanges 86, 87, which in turn are of resilient material to deflect and permit entry of the tabs. Further, a hole could be placed through the entire guide 90 so that a single fastener could be used. Still further, a latch mechanism, such as one using male and female members, could be employed.

The magnetic centerguide of this embodiment, being attached to the grid mounting plate which itself is connected to the conveyor chain, is readily mounted on the conveyor centerline, which is the preferred position. There may be instances, however, as will be illustrated in connection with subsequent embodiments, where mounting of the centerguide at a location other than the conveyor centerline is desirable. An alternate position might be desirable for a number of reasons which could include the form of the pans which are intended to ride on the grid, the fact that large pans are used covering multiple grids, or other matters of convenience, such as accommodating size constraints. Unless the context indicates otherwise, the use of the term centerguide herein is intended to encompass all such variations.

Figure 3E:
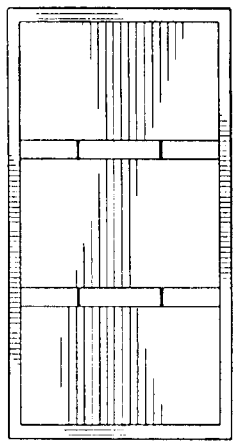
FIGS. 3a–3r depict a selection of pans used with the present invention.
Figure 3F:
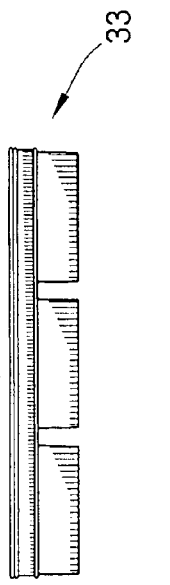
Figure 3A:
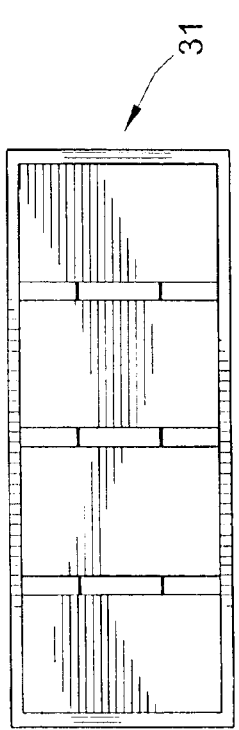
Figure 3B:
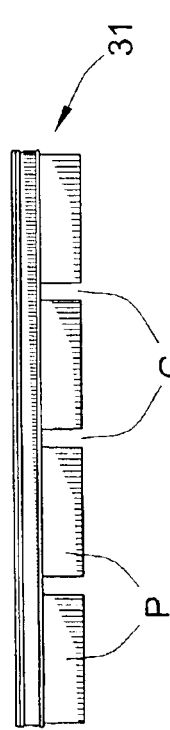
Figure 3C:
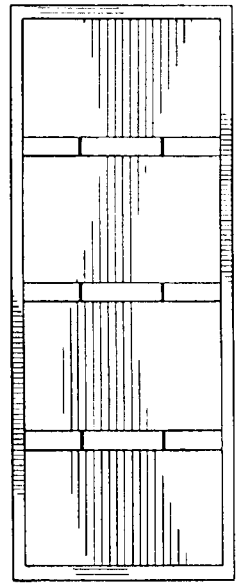
Figure 3D:
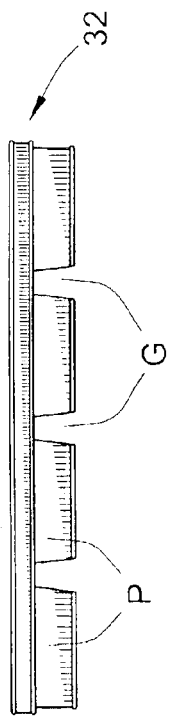
Figure 3I:
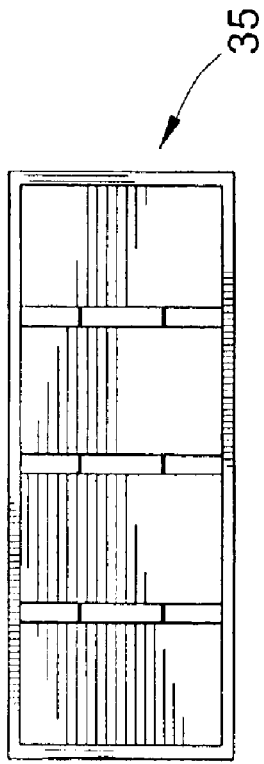
Figure 3J:
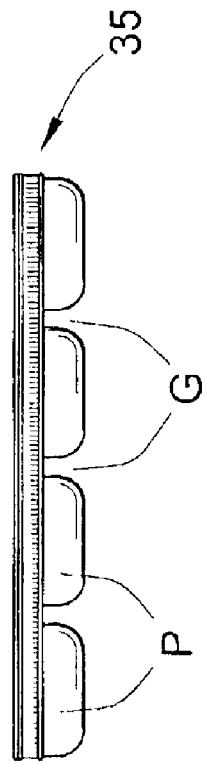
Figure 3G:
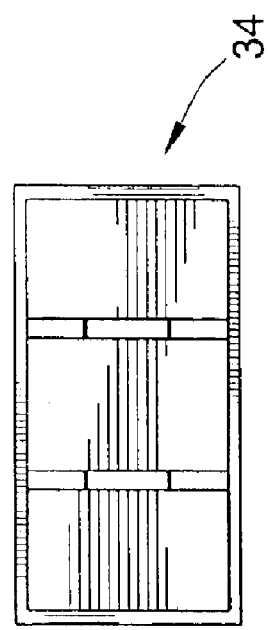
Figure 3H:
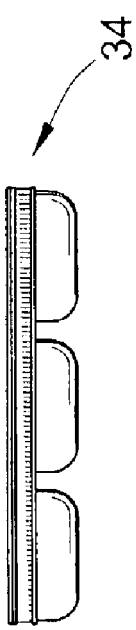
Figure 3K:
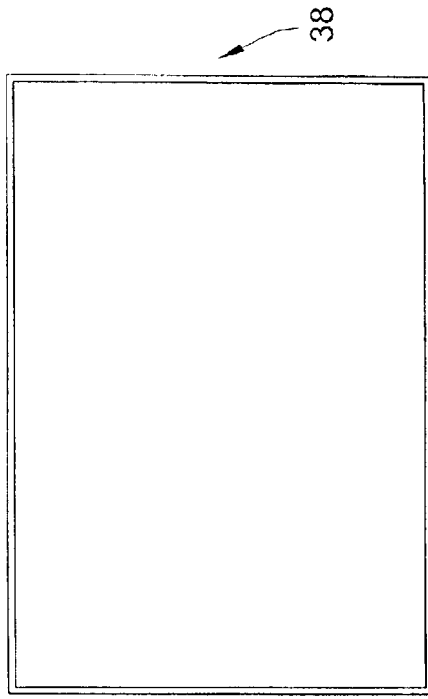
Figure 3L:
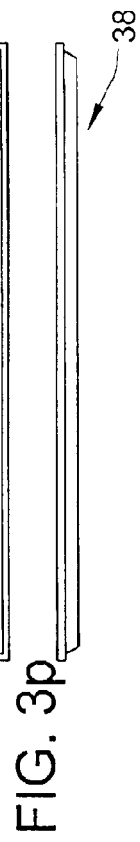
Figure 3M:
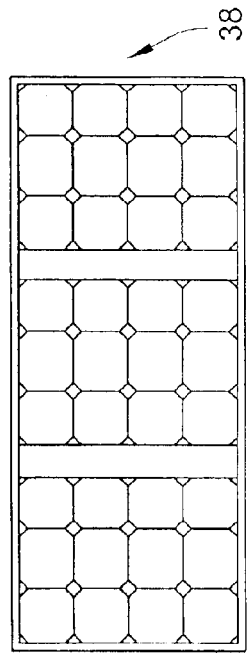
Figure 3N:
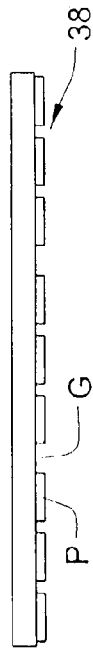
Figure 3O:
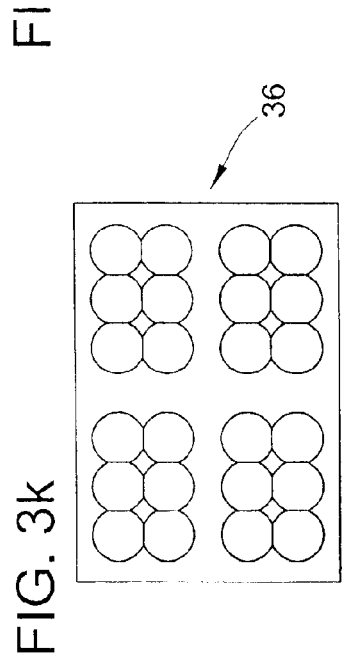
Figure 3P:
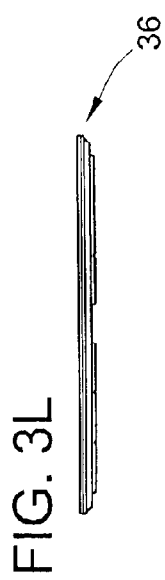
Figure 3Q:
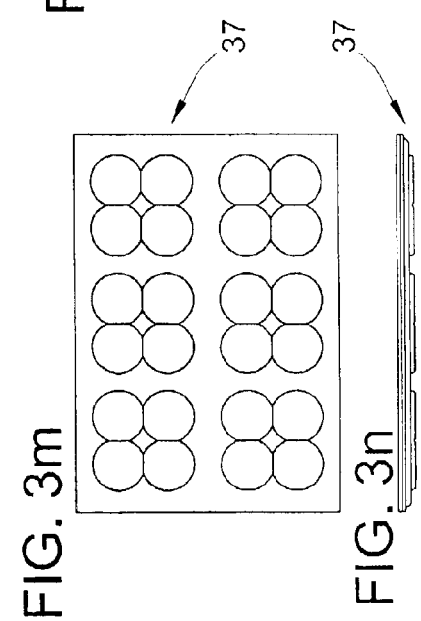
Figure 3R:
Figure 4A:
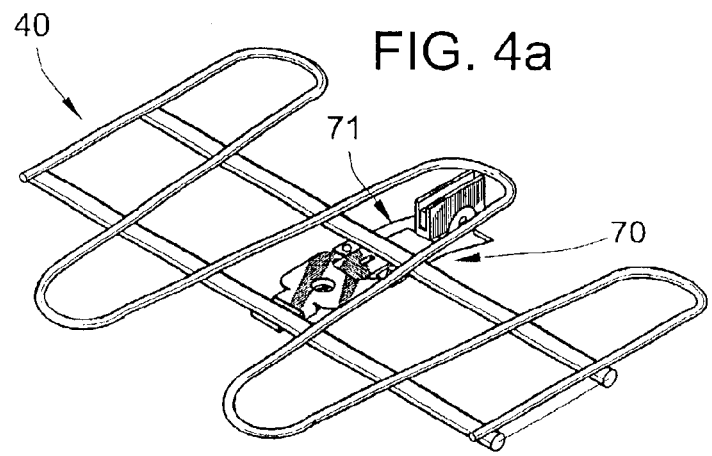
Figure 4B:
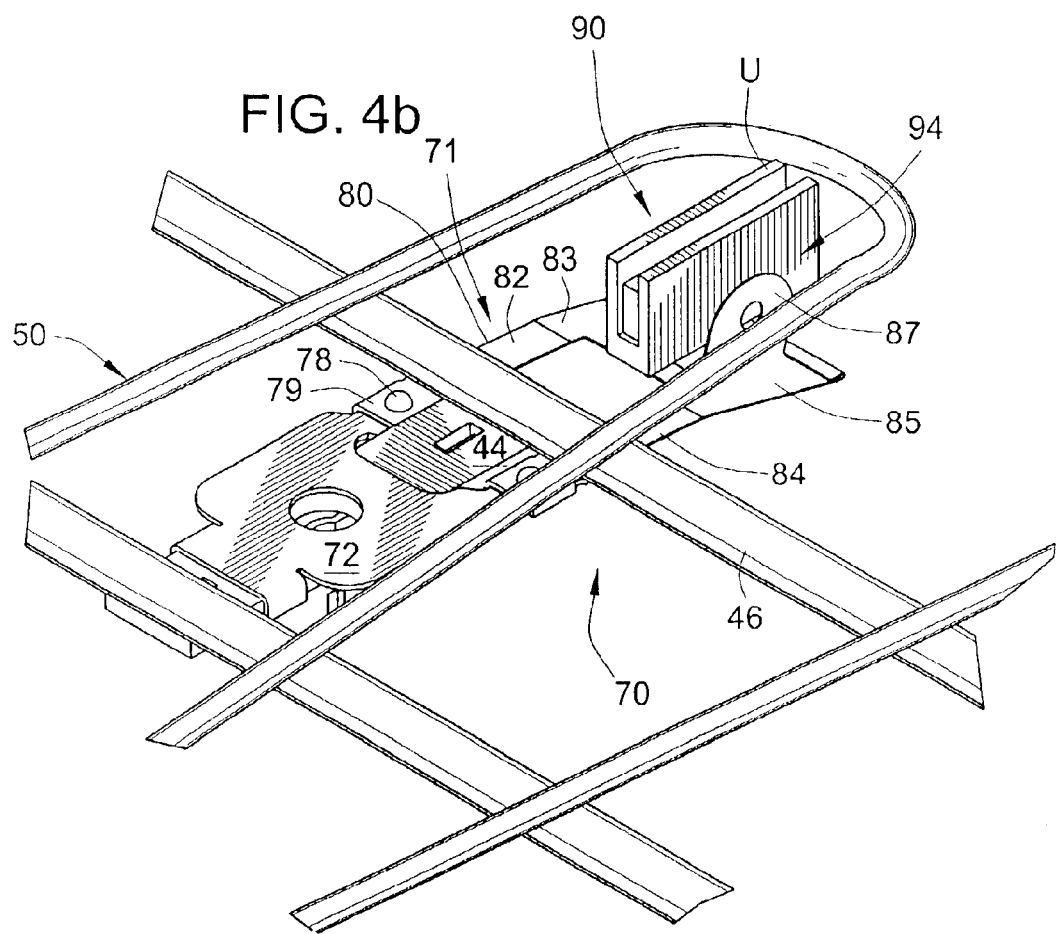
Figure 4C:
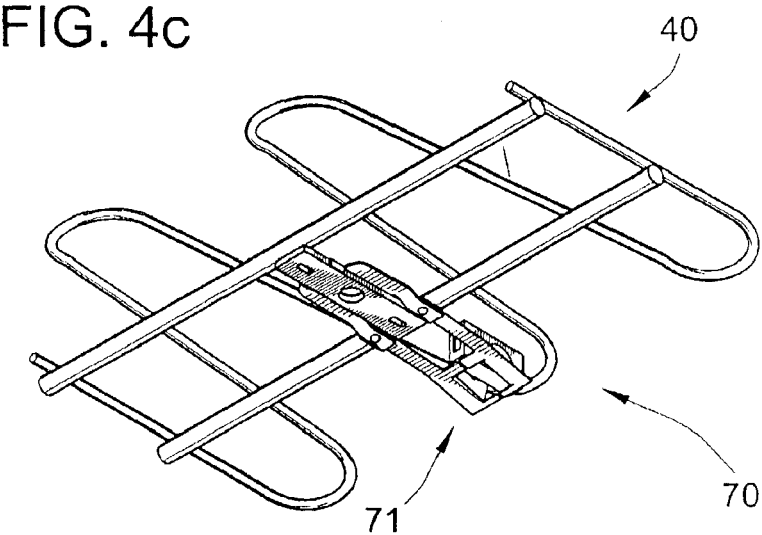
Figure 4D:
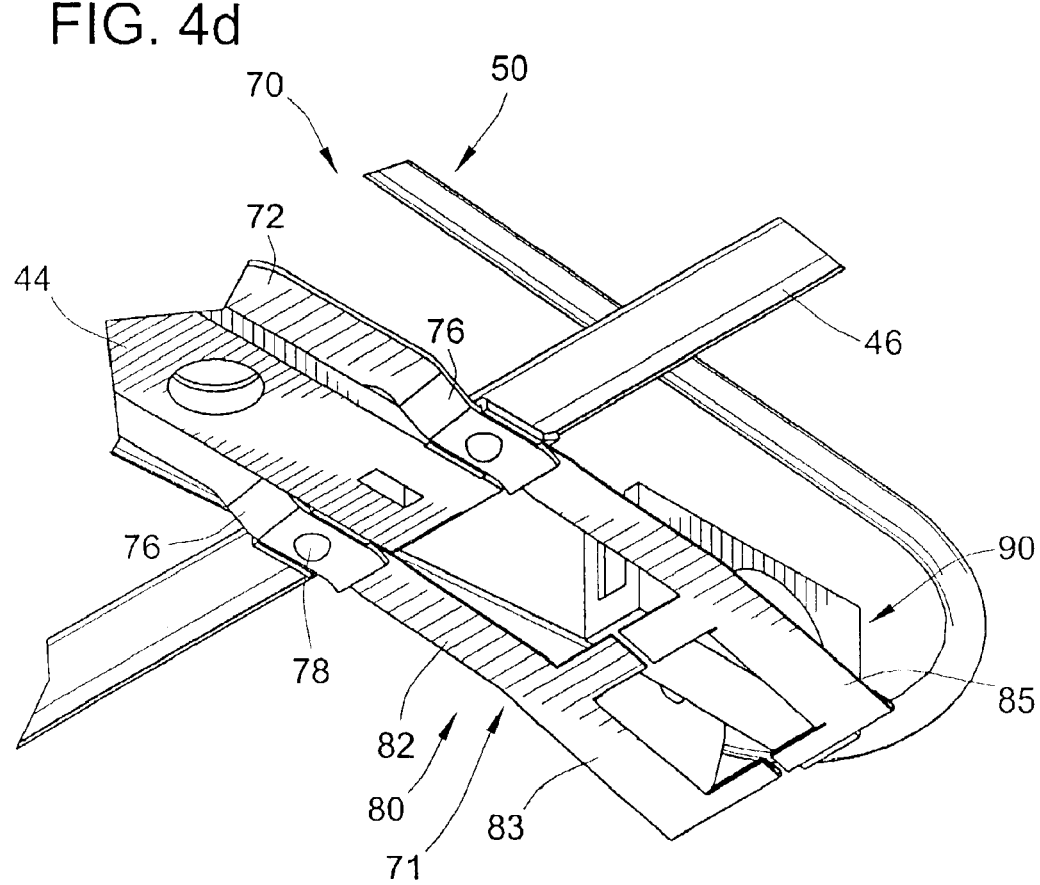
Figure 5A:
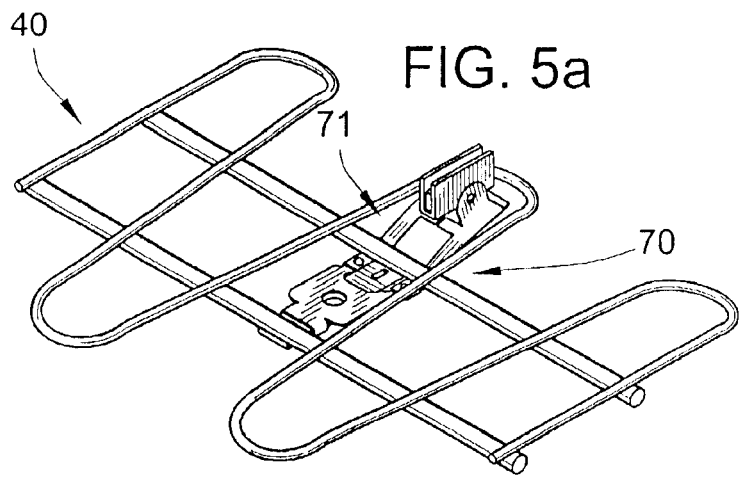
FIGS. 5a–5d depict the grid and universal centerguide of FIGS. 1–2, the guide being in a raised position.
Figure 5B:
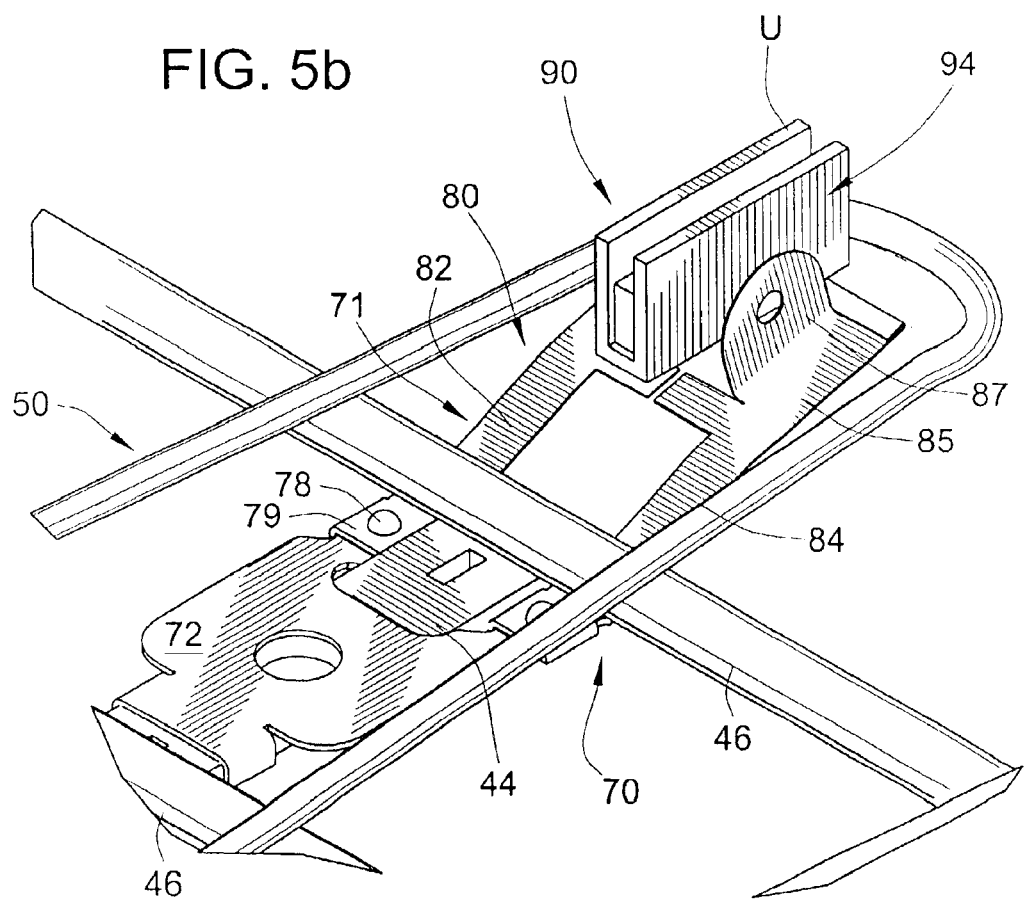
Figure 5C:
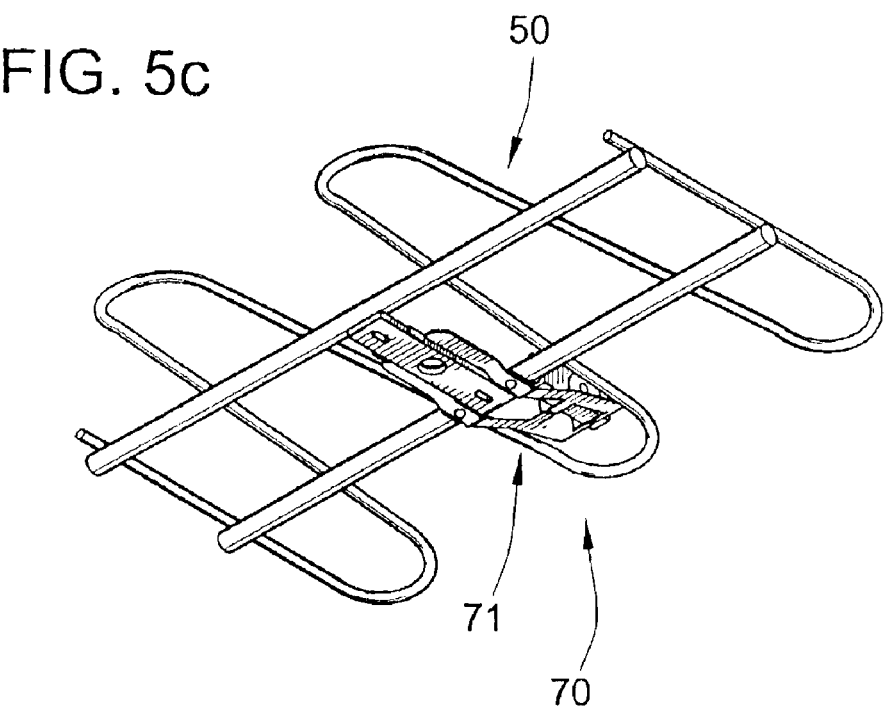
Figure 5D:
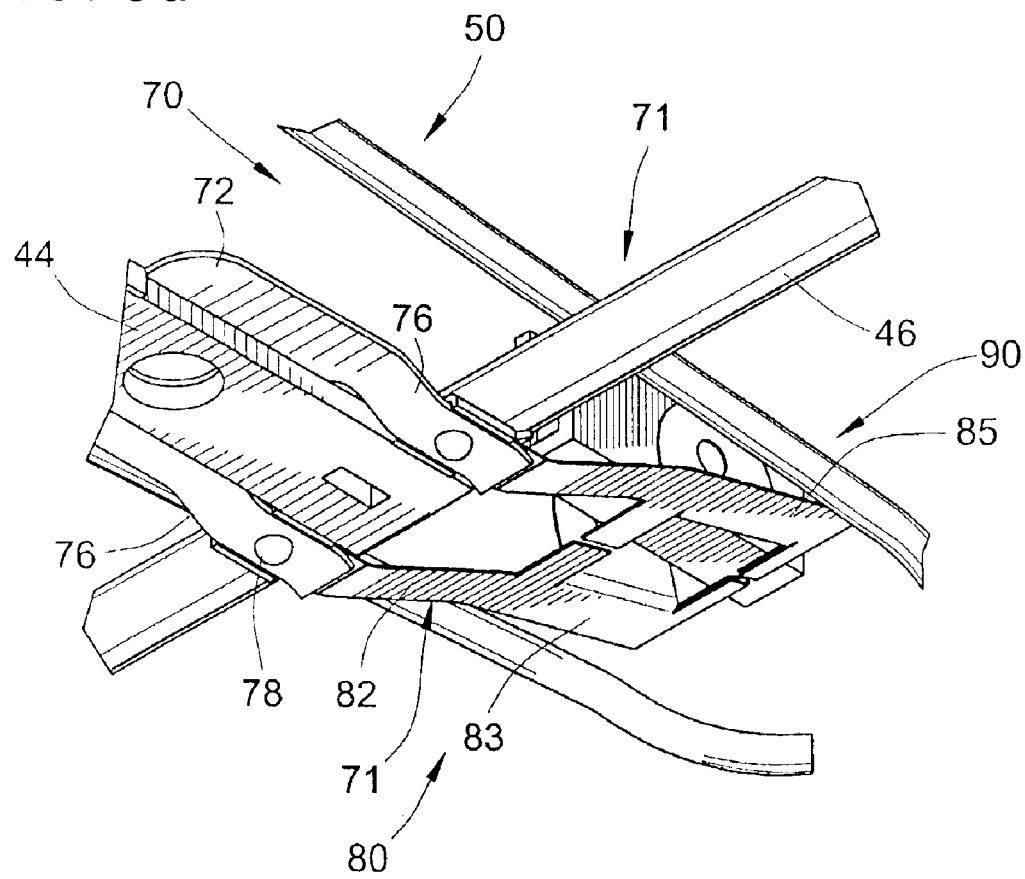

As noted in the background section above, pans in food processing operations, and particularly baking operations, come in all shapes and sizes depending on the product being processed. Some standard baking pans 31, 32, 33, 34, 35, 36, 37, 38, 39 have been depicted in FIGS. 3a–r. It can been seen that the pans generally include columns (extending up and down on the figures) and rows (extending side to side on the figures) of indentations or pockets P for receiving dough to be formed into bread loaves, rolls, buns, etc. The reference G denotes exemplary inter-pocket gaps. FIGS. 3a–3b depict a 4-pocket bread pan having four columns and one row. FIGS. 3c–3d depict a 4-pocket bread pan having four columns and one row, the pockets being slightly tapered. FIGS. 3e–3f depict a 3-pocket bread pan having three columns and one row. FIGS. 3g–3h depict a 3-pocket pan bread pan having three columns and one row, the pockets having radiused edges. FIGS. 3i–3j depict a 4-pocket bread pan having four columns and one row, the pockets having radiused edges. FIGS. 3k–3l depict a 4pocket bun pan having two columns and two rows, each pocket holding six buns. FIGS. 3m–3n depict a 6-pocket bun pan having three columns and two rows, each pocket holding four buns. FIGS. 3o–3p depicts a flat pan having no pockets. FIGS. 3q–3r depict a 3-pocket bun pan having nine columns and four rows.

Typically, a pan having an odd number of columns will have its centerline passing through a column of pockets. Typically, a pan having an even number of columns will have its centerline passing between a column of pockets. It will also be seen that the depth of the pockets differs, typically in the range of 1" to 6". The pockets of bun pans are typically in the range of 1" to 2" deep, while the pockets of bread pans are typically in the range of 3½" to 4½" deep.

Accordingly, it will be recognized that the universal guide 70 adapts to maintain the orientation of all of the above-described pans, and virtually any baking pan. The magnetic guide member 90 is adapted for vertical movement, preferably in a range including at or below the support surface, to above the support surface. In the embodiment shown in FIGS. 1b–1c, the guide member 90 is preferably biased to a neutral position above the support surface, generally in the range of ½" to 1½" above the support surface, and preferably about ¾" above the surface, measured from a top surface of the guide member 90. There are other embodiments which do not require this bias. In the FIG. 1b embodiment, when the swing arm 80 is spring biased, the spring is set to a biasing force less than the weight of a pan, which typically weigh around 10–20 lbs. Setting a lower biasing force is for the purpose of permitting the guide member 90 to move to a position at or below the support surface when a pocket is rested directly thereon. Thus the pans are always supported by the support surface of the grid. FIGS. 4a–4e show the magnetic guide member 90 in a lowered position about level with the support surface. FIGS. 5a–5d show the magnetic guide member 90 in a raised position well above the support surface and above the neutral position. This raised position is also the position taken by the guide 70 when a pan is removed from the grid by lifting the pan.

It can be seen in FIGS. 4a–4e and 5a–5d that the forward and rear edges of the mounting surfaces 83, 85 restrict the pivoting range of the guide member 90 relative to the mounting surfaces 83, 85 and the spring arm 80. That range is defined primarily by the distance the magnetic guide 90 is positioned above the surfaces 83, 85, which is preferably correlated with the vertical range of motion defined by the spring arm 80. Thus, the upper surface of the magnetic guide member 90 can stay in full contact with a surface of the pan throughout a full range of vertical motion as shown in the figures.

Attention is now directed to FIGS. 2a–2d. It will be seen that when a pan is located on the grid 40 with a pocket P directly above the guide member 90, the range of motion permits the magnetic guide member 90 to move or adjust downwardly to a position where its operative upper surface U is about level with the support surface S (See FIGS. 2a and 2c). More particularly, the guide member 90 has an upper surface U that moves to a position aligned with the support surface S, so that the upper surface of the magnetic guide 90 contacts the underside of the pocket P, which is generally horizontal, to retain the pan to the grid. The pivoting of the magnetic guide member 90 allows full contact with the pan.

It will also be seen that when a pan is located on the grid with two pocket columns P straddling the centerguide 70, the range of motion permits the magnetic guide member 90 to move or adjust upwardly into the inter-pocket gap G to also contact the underside of the pan (See FIGS. 2b and 2d), which includes both the spaces between the columns and rows of pockets, as well as the non-horizontal side surfaces of the pockets. For deep pockets such as those used in bread pans, the range of vertical motion of the magnetic guide member 90 may be limited so that it cannot extend upwardly far enough to contact the horizontal underside of the pan between pockets. In this case the pan will shift laterally a small degree and the magnetic guide member 90 will contact the underside of the pan at a side surface of the pocket, as shown in FIG. 2d. In fact, depending on the size of the guide member 90, the guide could contact both a side of a pocket and the horizontal underside of the pan between pockets, or even two opposing sides of opposing pockets. Most preferably, however, the magnet assembly 90 has a width which fits easily between in gaps G between pockets P such that the magnetic attraction of the guide to the pan is supplemented by mechanical interference between the guide and the trough in maintaining the orientation of the pan on the grid.

The magnetic centerguide assembly 70 of the present invention also permits secure handling of large pans, i.e. pans which span more than one grid. It is common for pans to be large enough to span two or more grids, and thus a single pan is associated with two centering guides 70 of adjacent grids 40. This requires very little adaptation by the centering guide 70, because they are centered on the conveyor chain and hence the path of travel. More specifically, when two grids carrying a single pan enter a turn, the inside edges of the grids 40 move closer together, while the outside edges of the grids 40 move farther apart. However, by way of the present invention, the centering guides 70 move only very slightly relative to each other by virtue of being centered on the path of travel. To the extent that any change in distance needs to be accounted for, the spring arm 80 can deflect to take up that play. Typically, the spring arm 80 may move slightly upwardly and/or torsionally deflect, but only to a very small degree. It can thus be seen that the centering guide 70 of the present invention provides a universal guide that adapts to virtually all different types of pans and operating conditions.

The magnet 92 of the illustrated embodiment includes north and south poles defining a magnet axis transverse to the path of travel. However, the magnet axis can be oriented in any direction, such as parallel to the path of travel. With the magnet axis transverse to the path of travel, as in the illustrated embodiment, the magnet housing 94 can comprise pole pieces of a magnetically permeable material that act as a flux guide to focus and increase the effective strength of the magnet, such as magnetic stainless steel. In the illustrated embodiment, the left and right members 96, 98 of the housing are pole pieces. The link 97 should not be of pole material so as not to short out the magnet 92, preferably non-magnetic sheet steel. At the same time, it may be desirable to place the magnet axis parallel to the path of travel, so that the magnetic guide member 90 has a two-pole contact with the pan no matter whether it is connected to the underside of a pocket, the horizontal portion of the underside of the pan or the side surface of a pocket. Thus the orientation of the magnet may be selected depending on the particular application.

The size and shape of the magnet can also be particularly configured for specific applications. For example, when a particular installation runs only a particular type of product, such as bread pans having approximately a four inch depth, it may be useful to employ a slightly modified magnetic guide in which the upper surface of the guide member may rest at about two inches or more above the support surface in the neutral position. This larger guide member 90 would also be tall enough to contact the underside of the pans between columns of pockets, rather than contacting the side surface of a pocket. Of course, the spring arm 80 would provide the requisite vertical movement to the guide member to give a range of movement that includes at or below the grid surface to several inches above that surface.

Figure 10A:
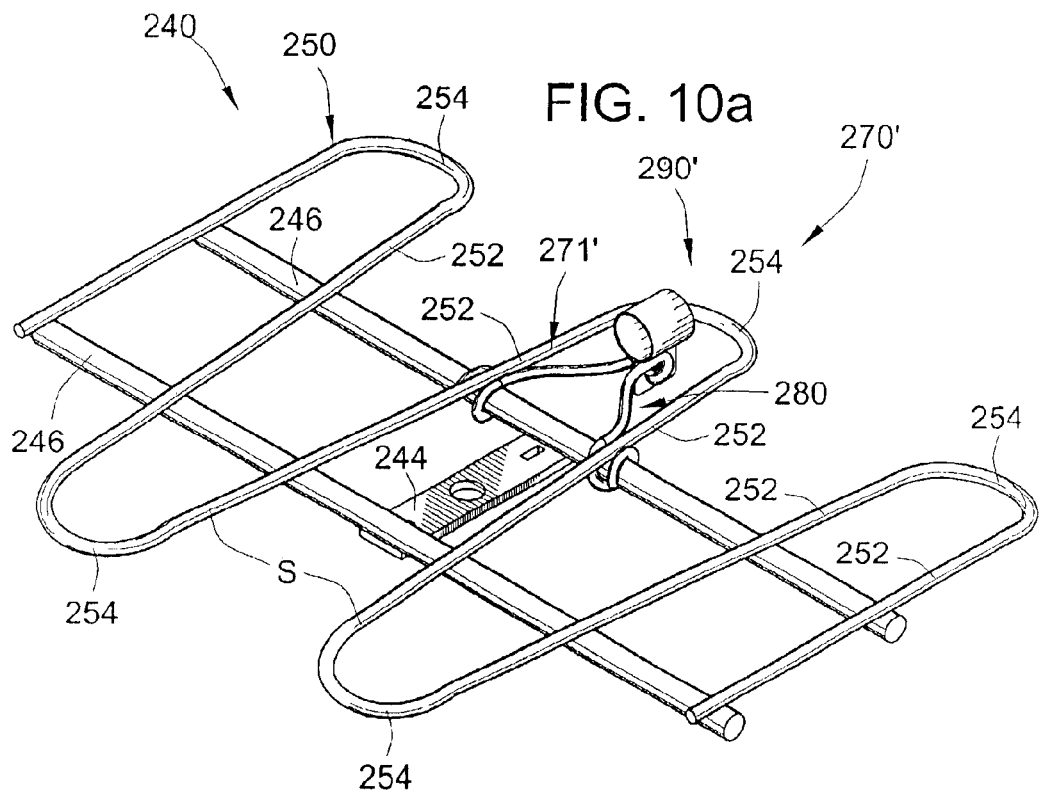
FIGS. 10a–10b depict another version of the embodiment of the universal centerguide shown in FIGS. 9a–9b.
Figure 10B:
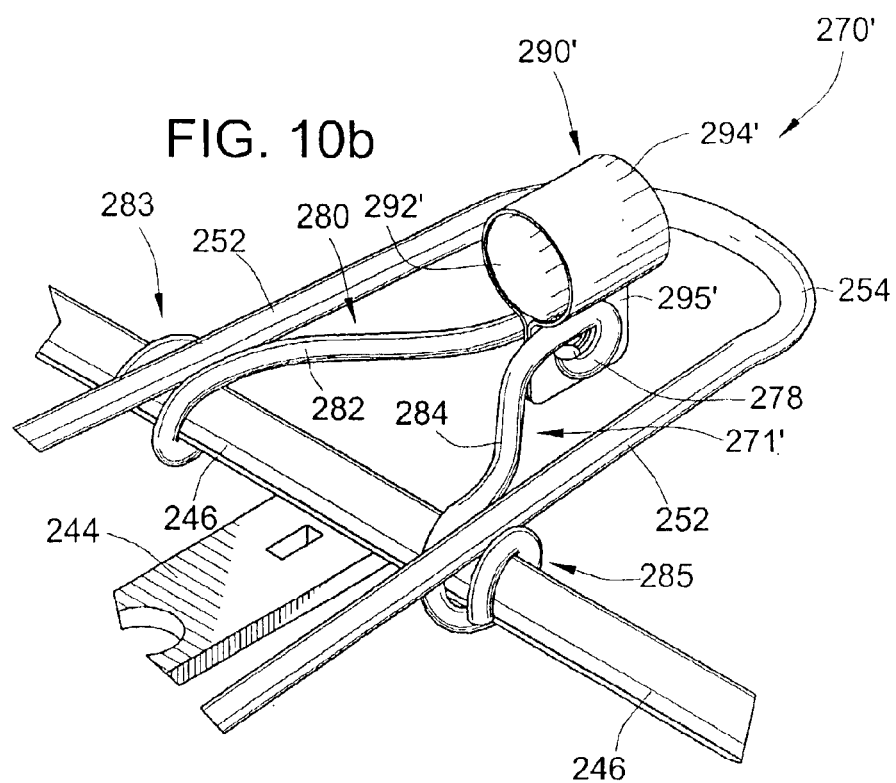

Differently shaped guide members 90 are also encompassed within the present invention. For example, the embodiment of the invention depicted in FIGS. 10a–10b illustrates a generally cylindrical magnetic guide 290'. Guides according to the invention may have virtually any cross-sectional shape. A sloped upper surface of the guide increases the possibility that at least a portion of the guide member 90 will fit between a column of pockets or indentations on the underside of a pan. A guide specifically designed for use with a particular pan type or sets of pan types can readily be employed, and could encompass a wide variety of cross-sectional shapes that are too numerous to list here, but can now be readily ascertainable by those skilled in this art. Likewise, many different shapes or structures (i.e., sloped or curved) may also be formed on the upper contact surface U of the guide member.

Turning now to FIGS. 7a and 7b, another embodiment of a guide assembly 170 constructed in accordance with the teachings of the present invention is depicted, along with a different grid 140. The grid 140 is similar to the previous grid 40, in that the grid 140 includes a grid mounting plate 144 and two support bars 146 attached to the plate. In this embodiment, the grid mounting plate 144 has a U-shaped cross-section and is structured for attachment to a conveyor by way of two spaced holes on each generally vertical leg of the U-shaped member. The support bars 146 are horizontally spaced and extend transversely relative to the path of travel (the path being to the upper right in FIG. 7a). Feet 147 are attached to the underside of the support bars 146 at opposing ends thereof. It will be recognized that the upper surface of the support bars 146 thus define the support surface S upon which the pans rest.

A guide support 171 provides means for attachment to the grid. In the illustrated embodiment the guide support includes a guide mounting plate 172 structured for attachment to grid mounting plate 144. As illustrated, the guide mounting plate 172 in bifurcated at the base thereof, to include two opposing arms 173 which are generally vertically oriented to correspond with the vertical legs of the U-shaped grid mounting plate 144. Each of the arms 173 includes two holes 174 corresponding to the holes in the two legs. As such, the attachment structure used to connect the grid 140 to the conveyor is also used to attach the centering guide 170. The two arms 173 of the guide mounting plate 172 are linked by a connector 175 that is generally horizontally disposed and structured to lie on the top surface of the grid mounting plate 144.

The guide support 171 also includes a spring arm 180 which is attached to the guide mounting plate 172 at the connector 175. Again, the spring arm 180 is a mechanical spring of flat sheet metal, although other types of spring arms may be employed as described above. A top plate 179 is used in conjunction with rivets 178 to attach the spring arm 180 similar to the previous embodiment. The spring arm 180 extends forwardly and includes two opposing and upstanding mounting flanges 187 which are preferably integrally formed with the spring arm 180. The magnetic guide member 190 is the same as described in the prior embodiment, and is similarly attached to the spring arm 180, although a washer 189 (FIG. 7b) has been depicted for taking up the gaps between the guide member 190 and the flanges 187. It will be recognized that the washer 189 or several washers can generally can be used anytime based on the size and shape of the guide member 190.

Figure 7D:
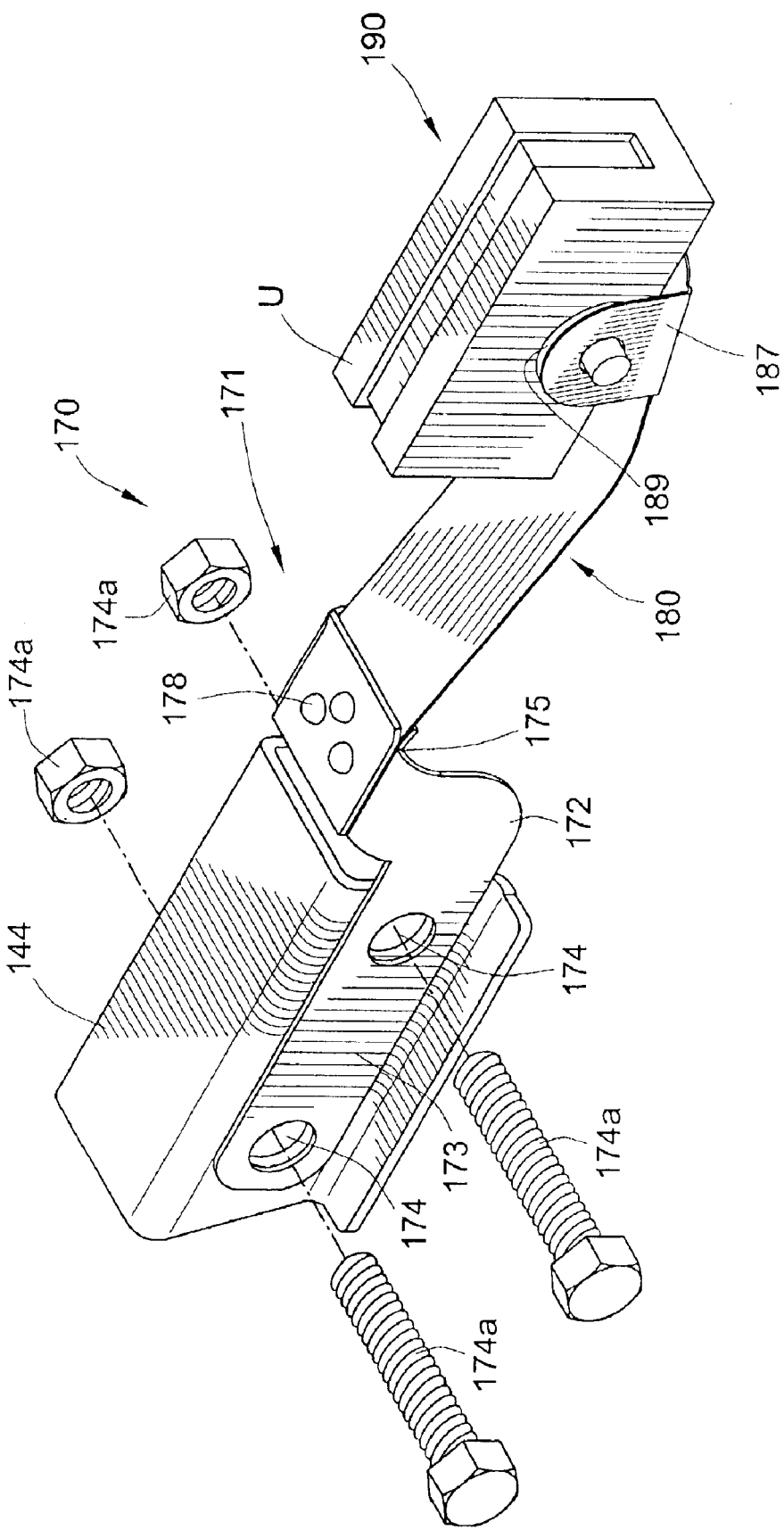

FIGS. 7c and 7d illustrate the retrofitting of the magnetic guide to the grid of FIGS. 7a and 7b. The guide assembly 171 is shown detached from the grid mounting plate 144 in FIG. 7c. It will be seen that the mounting structure, sometimes called the guide mounting plate 172, is bifurcated to include a pair of arms 173 separated by a gap 173a. The gap 173a is dimensioned for a reasonably close fit over the sides of the grid mounting plate 144. FIG. 7c shows the mounting base 172 of the guide support 171 in position near the grid support plate 174, and the arrow indicates the direction of motion for engaging the two, with the bifurcated portion of the guide support structure fitting over the grid portion, in this case the grid mounting plate 144. FIG. 7d shows the elements in position and fasteners 174a, which can be conventional machine bolts, inserted in the holes 174 for attaching the guide mounting structure to the grid mounting structure and in turn to the entire assembly to the conveyor.

As in the earlier embodiment depicted in FIGS. 1–5, the spring arm 180 allows the guide member 190 to move vertically to contact, adhere to and thereby guide pans placed on the grid. The guide member 190 is centered on the path of travel and is preferably biased to a neutral position above the support surface, generally in the range of ½" to 1½" above the support surface, and preferably about ¾" above the surface, measured from a top surface of the guide member 190. As the arm 180 is spring biased, the spring is set to a biasing force less than the weight of a pan, generally less than 10 lbs.

A related embodiment is shown in FIG. 8, the difference from FIG. 7a being that a different grid 140' is depicted. A grid mounting plate 144' similar to mounting plate 144 of FIG. 61, carries the grid structure 146, 147. The centering guide 170 is the same as shown in FIGS. 7a–7c, and is affixed to the grid mounting plate 144' by a guide mounting plate 172' as described in connection with FIGS. 7a–7c. This grid 140' includes a second support bar 150 which is attached on top of the transverse support bars 146', the second support bar 150 defining the support surface S on which the pans rest. As in the first embodiment, the support bar 150 is generally W-shaped, and zigzags back and forth across the support bars 146'. More specifically, the support bar 150 includes several longitudinal portions 152 extending generally parallel to the path of travel, although somewhat rotated to the left or right. The longitudinal portions 152 are connected by U-shaped portions 154, which preferably are bent slightly downwardly. As in all prior embodiments, the spring arm 180 allows the guide member 190 to move vertically as needed in any particular application, i.e. for any type of baking pan. The retrofitting process is the same as in the previous embodiment.

Figure 9A:
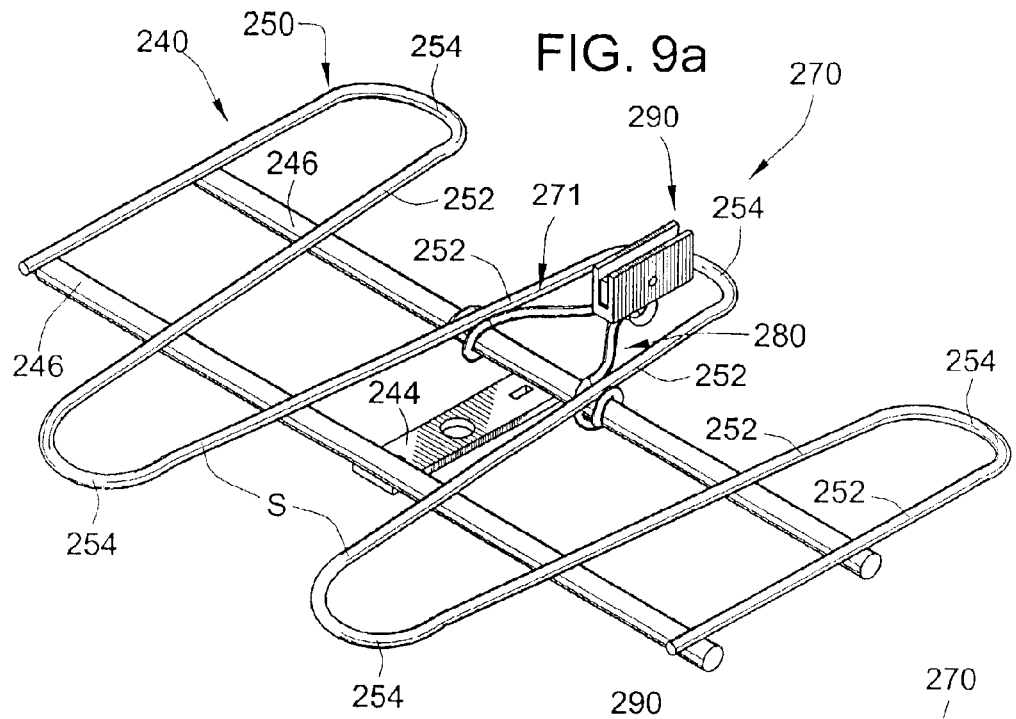
FIGS. 9a–9b depict yet another embodiment of the universal centerguide constructed in accordance with the teachings of the present invention.
Figure 9B:
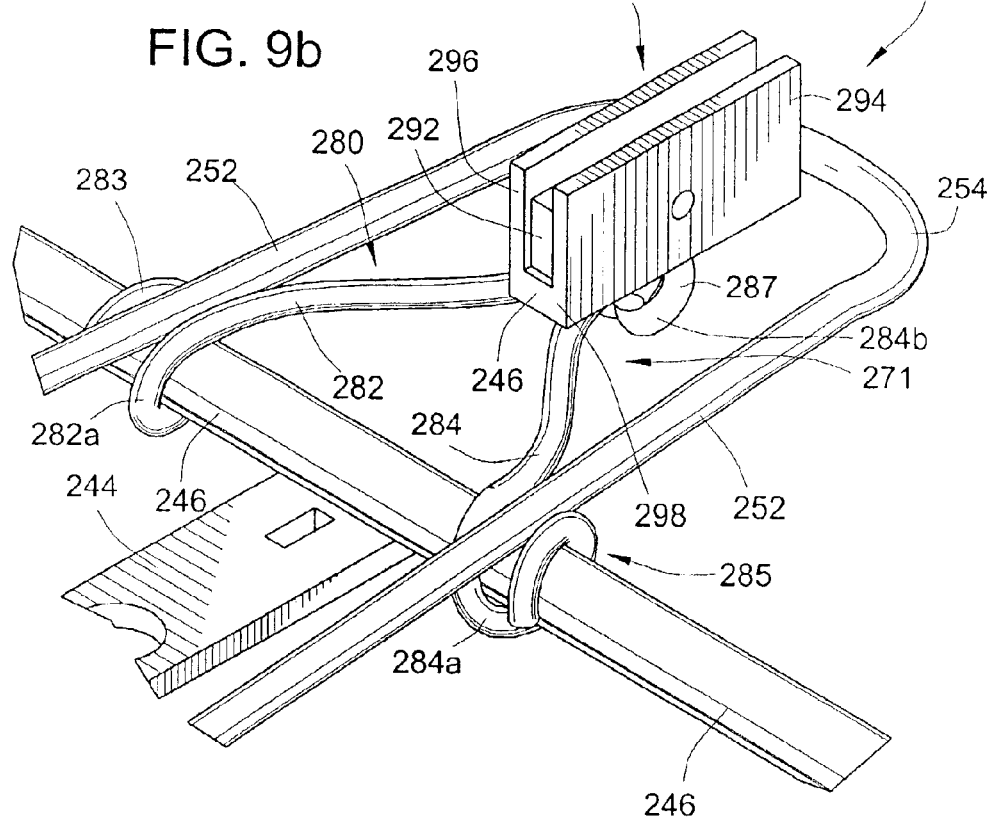

Other embodiments of the invention are depicted in FIGS. 9a–9b and 10a–10b. Referring now to FIGS. 9a–9b, the grid 240 is similar to prior embodiments, and includes a pendant plate (not shown) supporting a grid mounting plate 244. Support bars 246 are attached to the grid mounting plate 244. The second support bar 250 is attached to the transverse support bars 246 and defines a grid support surface S on which the pans rest. The second support bar 250 is generally W-shaped, and zigzags back and forth across the support bars 246, defined by straight portions 252 and U-shaped portions 254.

The universal centering guide 270 is attached to the grid structure. Whereas the prior embodiments employed attachment to the grid mounting plate, the present embodiment shows the use of one of the actual grid bars, in this case transverse support bar 246, for attachment of the magnetic guide 270. The spring arm 280 in the present embodiment is constructed of a resilient rod or wire rather than a flat metal spring. As shown, the spring arm 280 is completely bifurcated, and includes a left spring 282 and a right spring 284. First ends 282a, 284a of the springs 282, 284 are formed into coils 283, 285 which receive the transverse support bar 246. Opposing second ends 282b, 284b of the springs 282, 284 are formed into loops used as mounting features 287. The springs 282, 284 extend forwardly and inwardly to dispose the mounting features 287 proximate one another, the holes formed by the loops 287 being aligned to mount the guide 290. The guide 290 is identical in most respects to the magnetic guide 90 described above, except that the housing 294 for the magnet 292 includes a flange extending downwardly for connection to the loops 287, typically by way of a bolt (not shown) or the like, and providing for pivotal movement of the guide 290 relative to the spring arm 280, as previously described.

Figure 9C:
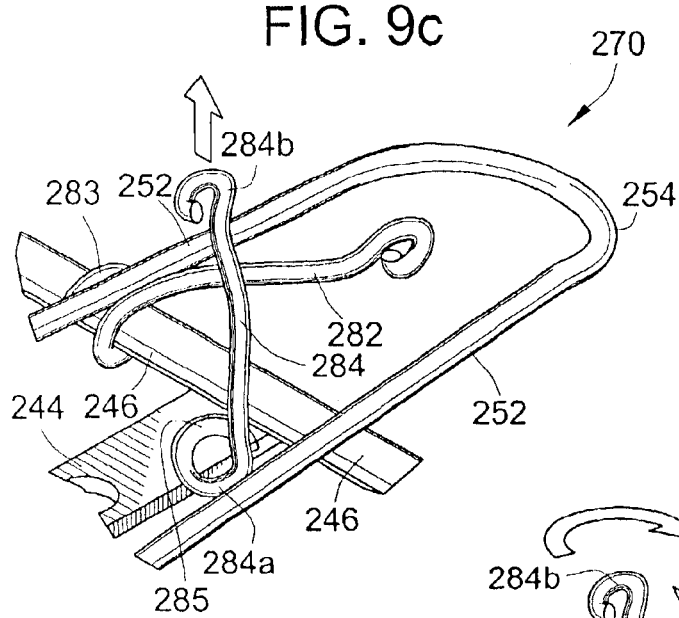
Figure 9D:
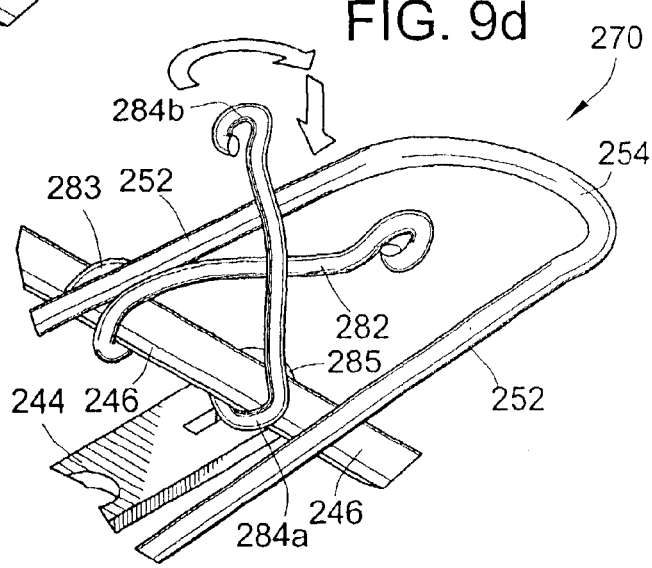
Figure 9E:
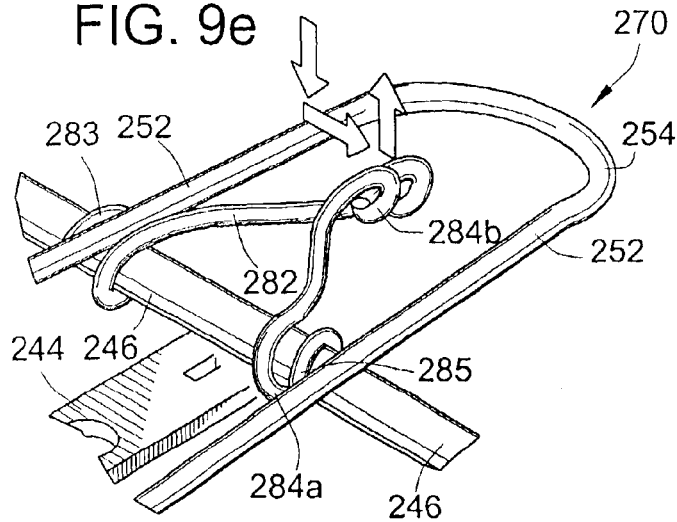

The centering guide 270 can be retrofit to an existing grid 240 by first attaching the individual spring arms 282, 284. More particularly, each of the left and right springs 282, 284 are attached to the grid by spreading the coil 283, 285 to form a gap in the rings of the coil. Maneuvering of the bifurcated spring arm over the grid structure is illustrated in FIG. 9c–9f where one spring arm 282 is already in place while the second spring arm 284 is being installed. For installation the coils 283, 285 is turned such that the axis of the coil is normal to the support bar 246, so that the gap can receive the support bar 246. FIG. 9c shows the spring wire 284 with its mounting end 284a having its coil 285 positioned below the grid bar 246 and rotated such that the gap between the arm 284 and the coil 285 is under the bar 246. As shown by the arrow the spring arm 284 is then raised such that the loop partly fits over the bar 246 as shown in FIG. 9d. Thereafter, as shown by the arrows in FIG. 9d, the spring arm 284 is first rotated and the free end 284b thereof depressed so that the loop 285 is brought to fit around the bar 246. This position is shown in FIG. 9e. In the preferred embodiment it is desired that the grid bar 252 fit between loops. To accomplish that, the arrows in FIG. 9e indicate that the free end 284b of the spring arm is first lowered until the end of the loop rotates to a position where it is under the plane of the bar 252. Thereafter the loop is pushed along the bar 246 until the coils embrace the bar 252, then the free end 284b is raised to bring the loop into its approximate mounting position for receiving the magnet. At that point the support bar 246 is received within the center of the coil 283, 285 and the second support bar 252 is positioned in a gap between coils of the loop. In this manner, the coils 283, 285 grip the support bar 250 between its rings, and the springs 282, 284 are prevented from rotating about the support bar 246. Rather, the springs 282, 284 are of a resilient material such as metal wire, allowing the springs to deflect while spring biasing the guide 290 to a neutral position as shown. Each of the springs 282, 284 are attached in turn as suggested in FIGS. 9c–9e, following which the magnetic guide 290 is attached to the loops or flanges 287 in any conventional manner such as by way of aligned holes in mounting flanges and a threaded fastener. This final step, illustrated in FIG. 9f, joins the free ends of the bifurcated guide construction to the magnet and to each other.

As with the prior embodiments, the spring arm 280 provides the guide member 290 with vertical movement, preferably in a range including at or below the support surface to above the support surface. As shown in FIGS. 9a–9b, the guide member 290 is biased to a neutral position above the support surface, preferably about 1¾ inches above the surface, measured from a top surface of the guide member 290. Accordingly, no matter which portion of a pan rests on top of the centering guide 290, the guide will attach to the pan and maintain its orientation.

The embodiment of the invention shown in FIGS. 10a–10b, is closely related to the embodiment depicted in FIGS. 9a–9b, and is retrofit in the same manner. In fact, the grid 240 is identical, as is the spring arm 280 used to attach the centering guide to the grid 240. However, in this embodiment the magnetic guide member 290' replaces the rectangular magnetic guide member 290 of the prior embodiment. The new guide member 290' is generally cylindrical in shape, defined by a cylindrical magnet 292'. The magnet 292' has its north and south poles aligned with the path of travel, i.e. the magnetic axis is generally parallel with the path of travel (the path being to the upper right in FIGS. 10a–10b). The outer annular surface of the magnet 292' is enclosed by a cover 294', the upper portion of which serves as the operative upper surface U. The cover 294' wraps around the magnet 292' and forms a flange 295' having a hole for attaching the guide member 290' to the loops 278 of the swing arm 280. It will thus be seen that the guide member 290' is adapted for vertical movement relative to the grid surface, and the guide member 290' is pivotally attached to the swing arm 280 to maintain a generally horizontal position throughout its range of motion.

Having reviewed the numerous embodiments of the invention, it can be seen that the invention is broad and primary in character. The invention provides a universal centering guide that is adaptable to all different types of product supports such as baking pans. Generally, the centering guide includes a guide member that automatically adjusts its position to fit the profile of any particular pan. The guide member includes a magnet that assists in retaining the pan to the grid. Preferably, the magnet has a full contact strength of at least 70 lbs, preferably about 80 lbs. This strength of the magnet ensures that the pan, once attached to the grid by the centering guide, will not move relative to the magnet and hence the grid unless desired, i.e. when a known lifting force is applied to the pan to remove the pan from the grid after processing. Since the pan and magnet do not move horizontally relative to the grid, and since the centerguide is very near the centerline of travel of the grid, the system reliably maintains the orientation of pans on the grid as the conveyor traverses both straight and curved sections of its track. In some embodiments, spring assist is provided to assist the magnet in engaging a pan once placed on the grid. In other more simplified embodiments, even the spring is not needed, and the magnet itself is adequate to raise from its rest position to its active guiding position once the pan is put in place, based on the magnetic attraction to the pan.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless-otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of retrofitting a magnetic guide to an existing grid, the grid being of the type for connection to a conveyor and structured to provide a support surface for carrying pans around a path defined by the conveyor, the method comprising steps of:

(a) providing a guide support having a bifurcated construction on at least one end thereof, (b) maneuvering the bifurcated construction around a portion of the grid to place the guide support in a partly assembled state on the grid, (c) securing the guide support to the grid and a magnet to the guide support, (d) at least part of step (c) involving making a connection through the bifurcated construction, (e) retrofitting the guide in such a manner by steps (a)–(d) that an operative upper surface of the magnet is positioned with respect to the support surface to cause the magnet to be attracted to a pan when placed on the grid.

2. The method of claim 1, wherein the bifurcated construction is at the base of the guide support and is configured to fit around a grid support plate which mounts the grid to the conveyor, and the step Cd) utilizes at least one fastener through the bifurcated construction and the grid support plate for securing the guide support and the grid to the conveyor.

3. The method as set forth in claim 1, wherein the guide support includes a bifurcated spring arm, the bifurcated construction being at free ends of the spring arm, the step (d) involving making a connection through the free ends of the spring arm and the magnet.

4. The method of claim 3, wherein the connection is made in such a way as to allow the magnet to pivot with respect to the guide support.

5. The method as set forth in claim 1, wherein the bifurcated construction comprises:
   a pair of independent spring arms, the spring arms having coils at a mounting end thereof for securing to the grid and a mounting feature at an opposite free end;
   the step (d) including forcing the coil springs around a support bar of the grid mounting structure to attach the support ends of the spring arms to the grid and connecting a magnet to both mounting features of the free ends of the spring arms.

6. A method of retrofitting a magnetic centerguide to an existing grid comprising the steps of:
   starting with an existing grid having a support surface for a pan and a mounting structure for attachment to a conveyor,
   providing a centerguide having a pair of spring arms, first ends of the spring arms having a mounting structure, arid second ends of the spring arms being unattached to each other,
   maneuvering the spring arms around a portion of the grid to achieve a partly assembled state,
   connecting the mounting structure to the grid, and
   connecting a magnet to both free ends of the spring arms in such a way that the spring arms bias the magnet upwardly at the support surface.

7. The method of claim 6, wherein the mounting structure has a base, first ends of the spring arms being attached to the base, and the method includes the step of attaching the base to the grid.

8. The method of claim 7, wherein the step of maneuvering includes separating the free ends of the spring arm to insert the centerguide over the grid prior to attachment of the base to the grid.

9. The method of claim 6, wherein the spring arms comprise a pair of wire springs, coils formed at the first ends of the wire springs having a diameter which corresponds to a diameter of a grid bar to which the spring arms are to be attached, and the method includes the steps of manipulating the coils to slide the spring arms over and onto the bars of the grid.

10. The method of claim 6, wherein the step of connecting the magnet comprises making the connection such that the magnet can pivot about the free ends of the spring arms to orient itself with respect to the underside of a pan.

11. A method of retrofitting a magnetic guide to a grid, the grid being of the type connected to a conveyor and structured to provide a support surface for carrying pans around a path defined by the conveyor, the method comprising the steps of:
   providing a guide support having two spring arms having free ends for receiving the magnet,
   attaching the spring arms to the grid with the free ends of the arms projecting toward the support surface, and
   connecting a magnet to the free ends of the spring arms to provide a unitary guide member capable of attaching to pans when placed on the support surface.

12. A method of retrofitting an existing grid with a guide, the grid defining a support surface for carrying a pan along a conveyor defining a path of travel, the grid including a grid mounting plate structured for attachment to the conveyor and a first support bar attached to the grid mounting plate, the method comprising:
   attaching a guide mounting plate to one of the grid mounting plate and the first support bar;
   mounting a magnetic guide member to the guide mourning plate for vertical movement relative to the support surface; and
   wherein the step of attaching the guide mounting plate includes attaching the guide mounting plate to the grid mourning plate.

13. The method of claim 12, wherein the step of mounting the guide member includes providing a spring arm connected at a first end to the mounting plate and connecting the opposing second end to the guide member.

14. The method of claim 12, wherein the step of attaching the guide mounting plate includes attaching the guide mounting plate to the grid mounting plate using the same attachment structure affixing the grid mounting plate to the conveyor.

15. The method of claim 12, wherein the step of attaching the guide mounting plate includes the steps of:
   disassembling the attachment structure linking the grid mounting plate to the conveyor;
   positioning the guide mounting plate proximate the grid mounting plate; and
   re-assembling the attachment structure to link the guide mounting plate to the grid mounting plate together and to the conveyor.

* * * * *